(12) United States Patent
Zhu et al.

(10) Patent No.: US 10,609,633 B2
(45) Date of Patent: *Mar. 31, 2020

(54) METHOD FOR TRIGGERING REGISTRAR PROTOCOL INTERACTION, ACCESS POINT, AND STATION

(71) Applicant: Huawei Technologies Co., Ltd., Shenzhen (CN)

(72) Inventors: Chong Zhu, Wuhan (CN); Gang Shan, Shenzhen (CN); Hao Zhi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/447,545

(22) Filed: Jun. 20, 2019

(65) Prior Publication Data

US 2019/0306788 A1 Oct. 3, 2019

Related U.S. Application Data

(63) Continuation of application No. 15/323,344, filed as application No. PCT/CN2014/088752 on Oct. 16, 2014, now Pat. No. 10,375,627.

(51) Int. Cl.
*H04W 48/16* (2009.01)
*H04W 48/14* (2009.01)
(Continued)

(52) U.S. Cl.
CPC ........... *H04W 48/16* (2013.01); *H04W 48/08* (2013.01); *H04W 48/14* (2013.01); *H04W 12/08* (2013.01); *H04W 84/12* (2013.01)

(58) Field of Classification Search
CPC ..................................................... H04W 48/16
(Continued)

(56) References Cited

U.S. PATENT DOCUMENTS 9,648,577 B1   5/2017   Bradish
2007/0072638 A1   3/2007   Yang et al.
(Continued)

FOREIGN PATENT DOCUMENTS

CN      103002550 A       3/2013
WO      2013128071 A1     9/2013
(Continued)

OTHER PUBLICATIONS

Machine Translation and Abstract of Chinese Publication No. CN103002550, Mar. 27, 2013, 10 pages.
(Continued)

*Primary Examiner* — Peter G Solinsky
(74) *Attorney, Agent, or Firm* — Conley Rose, P.C.

(57) ABSTRACT

A method for triggering a registrar protocol interaction. The method includes: receiving, by an access point, a probe request sent by at least one station, where the probe request includes an identifier of the access point; determining, by the access point, a first station in the at least one station according to the probe request sent by the at least one station, where the identifier included in the probe request sent by the first station matches an identifier of the access point, and a signal strength of the probe request sent by the first station is greater than a signal strength threshold; and automatically triggering, by the access point, a registrar protocol interaction with the first station.

20 Claims, 6 Drawing Sheets

(51) Int. Cl.
*H04W 48/08* (2009.01)
*H04W 84/12* (2009.01)
*H04W 12/08* (2009.01)

(58) Field of Classification Search
USPC .......................................................... 370/254
See application file for complete search history.

(56) References Cited

U.S. PATENT DOCUMENTS

| | | |
|---|---|---|
| 2009/0111466 A1 | 4/2009 | Montemurro et al. |
| 2012/0275320 A1 | 11/2012 | Iyer |
| 2013/0136018 A1 | 5/2013 | Jeong et al. |
| 2013/0231151 A1 | 9/2013 | Kneckt et al. |
| 2013/0254519 A1 | 9/2013 | Benoit et al. |
| 2013/0275760 A1 | 10/2013 | Hawkes et al. |
| 2014/0376453 A1 | 12/2014 | Smith |
| 2015/0350974 A1 | 12/2015 | Patil et al. |
| 2016/0007274 A1 | 1/2016 | Park et al. |
| 2016/0007386 A1 | 1/2016 | Park et al. |
| 2016/0066134 A1 | 3/2016 | Rybak et al. |
| 2017/0019841 A1 | 1/2017 | Jeong et al. |
| 2017/0171800 A1* | 6/2017 | Zhu ........................ H04W 48/16 |
| 2018/0139699 A1 | 5/2018 | Choi et al. |

FOREIGN PATENT DOCUMENTS

| | | |
|---|---|---|
| WO | 2013169044 A1 | 11/2013 |
| WO | 2013183881 A1 | 12/2013 |

OTHER PUBLICATIONS

WI-FI Alliance, "Wi-Fi Simple Configuration Technical Specification," Version 2.0.5, XP055280052, Aug. 4, 2014, 155 pages.
Foreign Communication From A Counterpart Application, Chinese Application No. 2014800746034, Chinese Search Report dated Sep. 23, 2018, 2 pages.
Foreign Communication From A Counterpart Application, Chinese Application No. 2014800746034, Chinese Office Action dated Oct. 9, 2018, 7 pages.
Foreign Communication From A Counterpart Application, European Application No. 14903925.7, Extended European Search Report dated Apr. 19, 2017, 10 pages.
Foreign Communication From A Counterpart Application, PCT Application No. PCT/CN2014/088752, English Translation of International Search Report dated Jul. 23, 2015, 2 pages.
Foreign Communication From A Counterpart Application, PCT Application No. PCT/CN2014/088752, English Translation of Written Opinion dated Jul. 23, 2015, 7 pages.
Foreign Communication From A Counterpart Application, Chinese Application No. 2014800746034, Chinese Notice of Allowance dated Sep. 4, 2019, 4 pages.

* cited by examiner

METHOD FOR TRIGGERING REGISTRAR PROTOCOL INTERACTION, ACCESS POINT, AND STATION

CROSS-REFERENCE TO RELATED APPLICATIONS

This application is a continuation of U.S. patent application Ser. No. 15/323,344, filed on Dec. 30, 2016, which is a national stage application of international application number PCT/CN2014/088752, filed on Oct. 16, 2014. Both of the aforementioned applications are hereby incorporated by reference in their entireties.

TECHNICAL FIELD

The present disclosure relates to the communications field, and in particular, to a method for triggering a registrar protocol interaction for a wireless simple configuration, an access point, and a station.

BACKGROUND

With development and widespread application of Wi-Fi technology, increasingly great importance is attached to security of Wi-Fi. High security causes high complexity of passwords to a certain extent. In an actual Wi-Fi service scenario, a complex password is manually entered to complete a Wi-Fi access configuration, resulting in that user experience deteriorates.

To simplify a Wi-Fi access configuration process, the Wi-Fi Alliance puts forward a Wi-Fi simple configuration method, which is also referred to as a Wi-Fi simple configuration (WSC). The Wi-Fi Alliance defines multiple triggering manners to trigger a registrar protocol interaction, to further complete the WSC. Typically, there are a personal identification number (PIN) triggering manner and a push button configuration (PBC) triggering manner. The two triggering manners may be simply described as follows: In the PIN triggering manner, a PIN is generated on a registrar (which may be integrated into an access point (AP) entity), and the PIN is entered on an enrollee (station (STA)), to complete matching and triggering. In the PBC triggering manner, physical buttons or virtual keys of a registrar (which may be integrated into an AP entity) and an enrollee STA are simultaneously pressed, to complete matching and triggering. The registrar protocol interaction is a protocol interaction process in which an enrollee (station) performs a password configuration on Wi-Fi by using a registrar AP.

However, human intervention is still required in the foregoing triggering manners, and operations are not simple and convenient.

SUMMARY

Embodiments of the present disclosure provide a method for triggering a registrar protocol interaction for a wireless simple configuration, an access point, and a station, so as to optimize a process of triggering a wireless simple configuration.

According to a first aspect, an embodiment of the present disclosure provides a method for triggering a registrar protocol interaction, used for performing a wireless simple configuration between an access point and at least one station, where the method includes: receiving, by the access point, a probe request sent by the at least one station, where the probe request includes an identifier (ID) of a target access point; determining, by the access point, a first station in the at least one station according to the probe request sent by the at least one station, where the identifier of the target access point included in the probe request sent by the first station matches an identifier of the access point, and a signal strength of the probe request sent by the first station is greater than a signal strength threshold; and automatically triggering, by the access point, a registrar protocol interaction between the access point and the first station.

With reference to the first aspect, in a first implementation manner of the first aspect, the determining, by the access point, a first station in the at least one station according to the probe request sent by the at least one station includes: sorting, by the access point, according to a signal strength of the probe request sent by the at least one station, and determining a probe request whose signal strength is greater than the signal strength threshold; and if an identifier of the first access point included in the probe request whose signal strength is greater than the signal strength threshold matches the identifier of the access point, determining that a station sending the probe request whose signal strength is greater than the signal strength threshold is used as the first station.

With reference to the first aspect or the first implementation manner of the first aspect, in a second implementation manner of the first aspect, the signal strength threshold is a signal strength threshold indicated by the probe request sent by the at least one station or a signal strength threshold specified by the access point.

With reference to any one of the first aspect to the second implementation manner of the first aspect, in a third implementation manner of the first aspect, after the determining, by the access point, a first station in the at least one station according to the probe request sent by the at least one station, the method further includes: sending a probe response to the first station, where the probe response is used by the first station to trigger a registrar protocol interaction with the access point.

With reference to the third implementation manner of the first aspect, in a fourth implementation manner of the first aspect, the probe response carries the signal strength threshold specified by the access point.

According to a second aspect, an embodiment of the present disclosure provides a method for triggering a registrar protocol interaction, used for performing a wireless simple configuration between a station and at least one access point, where the method includes: sending, by the station, a probe request to the at least one access point; receiving, by the station, a probe response that is sent by the at least one access point according to the probe request, where the probe response includes an identifier of a target station; determining, by the station, a first access point in the at least one access point according to the probe response sent by the at least one access point, where the identifier of the target station included in the probe response sent by the first access point matches an identifier of the station, and a signal strength of the probe response sent by the first access point is greater than a first signal strength threshold; and automatically triggering, by the station, a registrar protocol interaction between the station and the first access point.

With reference to the second aspect, in a first implementation manner of the second aspect, the determining, by the station, a first access point in the at least one station according to the probe response sent by the at least one access point includes: performing, by the station, sorting according to a signal strength of the probe response sent by the at least one access point, and determining a probe response whose signal strength is greater than the first signal strength threshold; and if the identifier of the target station included in the probe response whose signal strength is greater than the signal strength threshold matches the identifier of the station, determining that an access point sending the probe response whose signal strength is greater than the first signal strength threshold is used as the first access point.

With reference to the second aspect or the first implementation manner of the second aspect, in a second implementation manner of the second aspect, the first signal strength threshold is a signal strength threshold indicated by the probe response sent by the at least one access point or a signal strength threshold specified by the station.

With reference to any one of the second aspect to the second implementation manner of the second aspect, in a third implementation manner of the second aspect, before the receiving, by the station, a probe response sent by the at least one access point, the method further includes: receiving, by the station, a broadcast message sent by the first access point; and when determining that a signal strength of the broadcast message is greater than a second signal strength threshold, sending, by the station, a probe request to the first access point, where the probe request includes an identifier of the first access point, and is used by the first access point to trigger a registrar protocol interaction with the station.

With reference to the third implementation manner of the second aspect, in a fourth implementation manner of the second aspect, the probe request further includes the signal strength threshold specified by the station.

According to a third aspect, an embodiment of the present disclosure provides a method for triggering a registrar protocol interaction, used for performing a wireless simple configuration between a station and an access point, where the method includes: sending, by the station, a probe request to the access point, where the probe request includes an identifier of the access point; receiving, by the station, a probe response that is sent by the access point according to the probe request; determining, by the station, that a signal strength of the probe response is greater than a first signal strength threshold; and automatically triggering, by the station, a registrar protocol interaction between the station and the first access point.

With reference to the third aspect, in a first implementation manner of the third aspect, the first signal strength threshold is a signal strength threshold indicated by the probe response sent by the access point or a signal strength threshold specified by the station.

According to a fourth aspect, an embodiment of the present disclosure provides an access point, where the access point includes: a receiving module configured to receive a probe request sent by at least one station, where the probe request includes an identifier of a target access point; a processing module configured to determine a first station in the at least one station according to the probe request sent by the at least one station, where the identifier of the target access point included in the probe request sent by the first station matches an identifier of the access point, and a signal strength of the probe request sent by the first station is greater than a signal strength threshold; and a triggering module configured to automatically trigger a registrar protocol interaction between the access point and the first station.

With reference to the fourth aspect, in a first implementation manner of the fourth aspect, the processing module is specifically configured to: sort according to a signal strength of the probe request sent by the at least one station, and determine a probe request whose signal strength is greater than the signal strength threshold; and if the identifier of the target access point included in the probe request whose signal strength is greater than the signal strength threshold matches the identifier of the access point, determine that a station sending the probe request whose signal strength is greater than the signal strength threshold is used as the first station.

With reference to the fourth aspect or the first implementation manner of the fourth aspect, in a second implementation manner of the fourth aspect, the signal strength threshold is a signal strength threshold indicated by the probe request sent by the at least one station or a signal strength threshold specified by the access point.

With reference to any one of the fourth aspect to the second implementation manner of the fourth aspect, in a third implementation manner of the fourth aspect, the access point further includes a sending module configured to send a probe response to the first station after the processing module determines the first station in the at least one station according to the probe request sent by the at least one station, where the probe response is used by the first station to trigger a registrar protocol interaction with the access point.

With reference to the third implementation manner of the fourth aspect, in a fourth implementation manner of the fourth aspect, the probe response carries the signal strength threshold specified by the access point.

According to a fifth aspect, an embodiment of the present disclosure provides a station, where the station includes: a sending module configured to send a probe request to the at least one access point; a receiving module configured to receive a probe response that is sent by the at least one access point according to the probe request, where the probe response includes an identifier of a target station; a processing module configured to determine a first access point in the at least one access point according to the probe response sent by the at least one access point, where the identifier of the target station included in the probe response sent by the first access point matches an identifier of the station, and a signal strength of the probe response sent by the first access point is greater than a first signal strength threshold; and a triggering module configured to automatically trigger, by the station, a registrar protocol interaction between the station and the first access point.

With reference to the fifth aspect, in a first implementation manner of the fifth aspect, the processing module is specifically configured to: sort according to a signal strength of the probe response sent by the at least one access point, and determine a probe response whose signal strength is greater than the first signal strength threshold; and if the identifier of the target station included in the probe response whose signal strength is greater than the signal strength threshold matches the identifier of the station, determine that an access point sending the probe response whose signal strength is greater than the first signal strength threshold is used as the first access point.

With reference to the fifth aspect or the first implementation manner of the fifth aspect, in a second implementation manner of the fifth aspect, the first signal strength threshold is a signal strength threshold indicated by the probe response sent by the at least one access point or a signal strength threshold specified by the station.

With reference to any one of the fifth aspect to the second implementation manner of the fifth aspect, in a third implementation manner of the fifth aspect, before the receiving module receives the probe response sent by the at least one access point, the receiving module is further configured to receive a broadcast message sent by the first access point; and the station further includes the sending module, where when the processing module determines that a signal strength of the broadcast message is greater than a second signal strength threshold, the sending module is configured to send a probe request to the access point, where the probe request includes an identifier of the access point, and is used by the access point to trigger a registrar protocol interaction with the station.

With reference to the third implementation manner of the fifth aspect, in a fourth implementation manner of the fifth aspect, the probe request further includes the signal strength threshold specified by the station.

According to a sixth aspect, an embodiment of the present disclosure provides a station, where the station includes: a sending module configured to send a probe request to the access point, where the probe request includes an identifier of the access point; a receiving module configured to receive a probe response that is sent by the access point according to the probe request; a determining module configured to determine that a signal strength of the probe response is greater than a first signal strength threshold; and a triggering module configured to automatically trigger a registrar protocol interaction between the station and the access point.

With reference to the sixth aspect, in a first implementation manner of the sixth aspect, the first signal strength threshold is a signal strength threshold indicated by the probe response sent by the access point or a signal strength threshold specified by the station.

According to a seventh aspect, an embodiment of the present disclosure provides an access point, where the access point includes: a processor, a memory, and a transceiver, where the processor, the memory, and the transceiver communicate with each other by using a bus; the memory is configured to store an instruction; the transceiver is configured to receive a probe request sent by the at least one station, where the probe request includes an identifier of a target access point; the processor is configured to determine a first station in the at least one station according to the probe request sent by the at least one station, where the identifier of the target access point included in the probe request sent by the first station matches an identifier of the access point, and a signal strength of the probe request sent by the first station is greater than a signal strength threshold; and the processor is further configured to automatically trigger a registrar protocol interaction between the access point and the first station.

With reference to the seventh aspect, in a first implementation manner of the seventh aspect, the processor is specifically configured to: sort according to a signal strength of the probe request sent by the at least one station, and determine a probe request whose signal strength is greater than the signal strength threshold; and if the identifier of the target access point included in the probe request whose signal strength is greater than the signal strength threshold matches the identifier of the access point, determine that a station sending the probe request whose signal strength is greater than the signal strength threshold is used as the first station.

With reference to the seventh aspect or the first implementation manner of the seventh aspect, in a second implementation manner of the seventh aspect, the signal strength threshold is a signal strength threshold indicated by the probe request sent by the at least one station or a signal strength threshold specified by the access point.

With reference to any one of the seventh aspect to the second implementation manner of the seventh aspect, in a third implementation manner of the seventh aspect, the processor is further configured to: after determining the first station in the at least one station according to the probe request sent by the at least one station, control the transceiver to send a probe response to the first station, where the probe response is used by the first station to trigger a registrar protocol interaction with the access point.

With reference to the third implementation manner of the seventh aspect, in a fourth implementation manner of the seventh aspect, the probe response carries the signal strength threshold specified by the access point.

According to an eighth aspect, an embodiment of the present disclosure provides a station, where the station includes: a processor, a memory, and a transceiver, where the processor, the memory, and the transceiver communicate with each other by using a bus; the memory is configured to store an instruction; the transceiver is configured to send a probe request to at least one access point; the transceiver is further configured to receive a probe response that is sent by the at least one access point according to the probe request, where the probe response includes an identifier of a target station; the processor is configured to determine a first access point in the at least one access point according to the probe response sent by the at least one access point, where the identifier of the target station included in the probe response sent by the first access point matches an identifier of the station, and a signal strength of the probe response sent by the first access point is greater than a first signal strength threshold; and the processor is further configured to automatically trigger a registrar protocol interaction between the station and the first access point.

With reference to the eighth aspect, in a first implementation manner of the eighth aspect, the processor is specifically configured to: sort according to a signal strength of the probe response sent by the at least one access point, and determine a probe response whose signal strength is greater than the first signal strength threshold; and if the identifier of the target station included in the probe response whose signal strength is greater than the signal strength threshold matches the identifier of the station, determine that an access point sending the probe response whose signal strength is greater than the first signal strength threshold is used as the first access point.

With reference to the eighth aspect or the first implementation manner of the eighth aspect, in a second implementation manner of the eighth aspect, the first signal strength threshold is a signal strength threshold indicated by the probe response sent by the at least one access point or a signal strength threshold specified by the station.

With reference to any one of the eighth aspect to the second implementation manner of the eighth aspect, in a third implementation manner of the eighth aspect, before the transceiver receives the probe response sent by the at least one access point, the transceiver is further configured to receive a broadcast message sent by the first access point; and when determining that a signal strength of the broadcast message is greater than a second signal strength threshold, the processor controls the transceiver to send a probe request to the access point, where the probe request includes an identifier of the access point, and is used by the access point to trigger a registrar protocol interaction with the station.

With reference to the third implementation manner of the eighth aspect, in a fourth implementation manner of the eighth aspect, the probe request further includes the signal strength threshold specified by the station.

According to a sixth aspect, an embodiment of the present disclosure provides a station, where the station includes: a processor, a memory, and a transceiver, where the processor, the memory, and the transceiver communicate with each other by using a bus; the memory is configured to store an instruction; the transceiver is configured to send a probe request to the access point, where the probe request includes an identifier of the access point; the transceiver is further configured to receive a probe response that is sent by the access point according to the probe request; the processor is configured to determine that a signal strength of the probe response is greater than a first signal strength threshold; and the processor is further configured to automatically trigger a registrar protocol interaction between the station and the first access point.

With reference to the sixth aspect, in a first implementation manner of the sixth aspect, the first signal strength threshold is a signal strength threshold indicated by the probe response sent by the access point or a signal strength threshold specified by the station.

In the solutions provided in the embodiments of the present disclosure, an access point receives a probe request, and determines that an identifier of a first access point included in the probe request matches an identifier of the access point, and that a signal strength of the probe request is greater than a signal strength threshold; or a station receives a probe response, and determines that an identifier of a first station included in the probe response matches an identifier of the station, and that a signal strength of the probe response is greater than a signal strength threshold. In this way, matching between a station and an access point is implemented based on a signal strength, a registrar protocol interaction between the access point and the station is automatically triggered, and a process of triggering a registrar protocol interaction for a Wi-Fi configuration is optimized.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
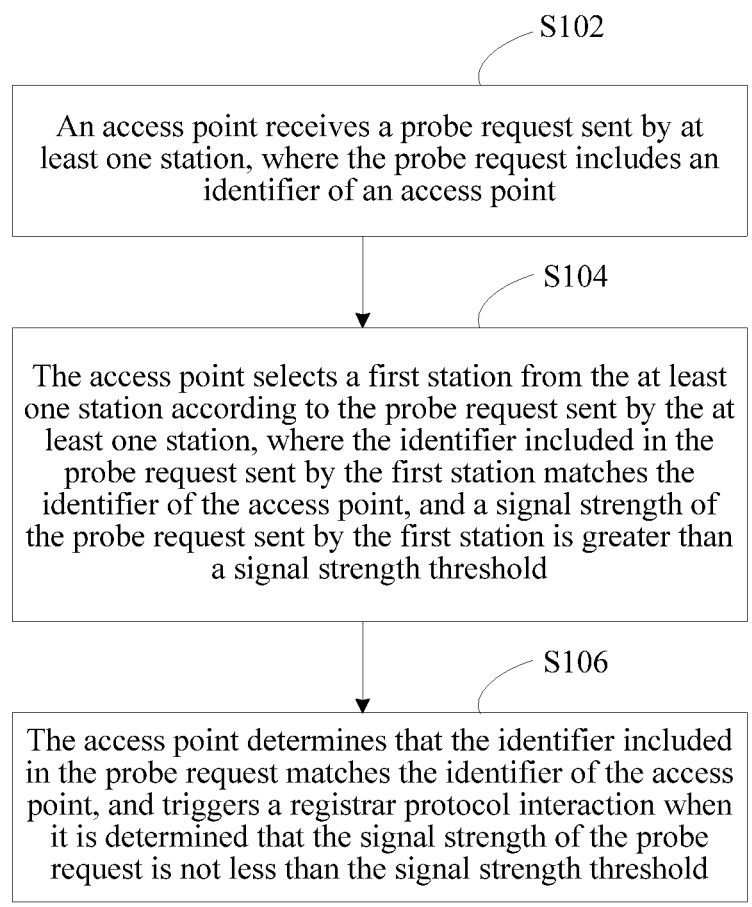
FIG. 1 is a schematic flowchart of a method for triggering a registrar protocol interaction according to Embodiment 1 of the present disclosure.

To make the objectives, technical solutions, and advantages of the present disclosure clearer, the following further describes the embodiments of the present disclosure in detail with reference to the accompanying drawings. To understand the present disclosure, numerous specific details are described in the following detailed descriptions. However, a person skilled in the art should understand that the present disclosure can be implemented without these specific details. In another instance, a known method, process, component, circuit, and the like are not described in detail, so as to avoid unnecessary ambiguity of the embodiments. The described embodiments are a part rather than all of the embodiments of the present disclosure. All other embodiments obtained by a person of ordinary skill in the art based on the embodiments of the present disclosure without creative efforts shall fall within the protection scope of the present disclosure.

Some procedures described below include multiple operations that occur in a particular order. However, it should be clearly learned that these operations may not be performed in the order of their occurrence in this specification or performed concurrently. Sequence numbers, such as 102 and 104, of the operations are merely used to distinguish different operations, and the sequence numbers do not represent any execution order. In addition, these procedures may include more or less operations, and these operations may be performed in order or performed concurrently.

It should be noted that descriptions of "first", "second", and the like in this specification are used to distinguish different messages, devices, modules, networks, or the like, do not represent a sequential order, and also do not limit that "first" and "second" are different types. "If" in this specification represents that a condition or a state is met, and includes a meaning, such as "when", "after a condition is met", or "it is determined that a condition is met". A "Message" is a carrier carrying some information, and includes multiple forms, such as signaling, a communication signal, and a data message. A signal strength threshold refers to a lowest acceptable standard of a signal strength. "Automatically" refers to that a related operation is spontaneously performed, without human intervention.

It should be noted that, in an optional implementation manner, the broadcast message may be a beacon frame, the probe request may be a Probe Request, and the probe response may be a Probe Response. In an optional implementation manner, an identifier of the access point may be a physical media access control (MAC) address of the access point, and an identifier of the station may be a physical MAC address of the station. The indicated signal strength threshold may be indicated by a specific numerical value of a signal strength threshold, or may be an identifier. The access point or the station stores a correspondence between the identifier and a numerical value of the signal strength threshold. The access point or the station can obtain the numerical value of the signal strength threshold according to the identifier. The specified signal strength threshold is a signal strength threshold that is set by the access point or the station, may be a specific numerical value, and indicates a lowest requirement on a signal strength achieved by a received message. When the specified signal strength threshold is added to a message for sending, the numerical value may be indicated by using the identifier.

Embodiment 1 of the present disclosure provides a method for triggering a registrar protocol interaction, used for performing a wireless simple configuration between an access point and at least one station. As shown in FIG. 1, the method 100 includes:

S102: The access point receives a probe request sent by the at least one station, where the probe request includes an identifier of a target access point.

S104: The access point determines a first station in the at least one station according to the probe request sent by the at least one station, where the identifier of the target access point included in the probe request sent by the first station matches an identifier of the access point, and a signal strength of the probe request sent by the first station is greater than a signal strength threshold.

S106: The access point automatically triggers a registrar protocol interaction between the access point and the first station.

In an optional implementation manner, the target access point may be an access point establishing a connection to the at least one station. The target access point may receive the probe request and respond to the station sending the probe request. That the identifier of the target access point included in the probe request sent by the first station matches the identifier of the access point may be: the identifier of the target access point is the same as the identifier of the access point. For example, the identifier of the target access point may be a physical MAC address of the target access point, and the MAC address of the target access point is the same as a MAC address of the access point. Alternatively, the identifier of the target access point may be an identifier code, and an identifier corresponding to the identifier code is the same as the identifier of the access point. A specific implementation manner in which the identifier of the target access point matches the identifier of the access point is not limited in the present disclosure.

In an optional implementation manner, after determining the first station in the at least one station according to the probe request sent by the at least one station, the access point directly and automatically triggers a registrar protocol interaction between the access point and the first station. "Directly" refers to that the access point can trigger a registrar protocol interaction between the access point and the first station after determining the first station, without needing to perform other processing, for example, determining of another condition. That the access point automatically triggers a registrar protocol interaction between the access point and the first station may be that the access point triggers a registrar protocol interaction mechanism, and when receiving a registrar protocol message of the first station, the access point responds to the message; or may be that the access point initiates a related message of a registrar protocol interaction, such as a request, to the first station. A process of the registrar protocol interaction is not limited in the present disclosure. Optionally, the first station can be the station that the identifier of the target access point included in the probe request sent by the determined station matches the identifier of the access point, and the signal strength of the probe request sent by the first station is equal to the signal strength threshold.

According to the method for triggering a registrar protocol interaction for a WSC provided in this embodiment, an access point determines that an identifier of a target access point included in a probe request sent by the first station matches the access point, and that a signal strength of the probe request is greater than a signal strength threshold. In this way, matching between a station and an access point is implemented, a registrar protocol is automatically triggered, and a process of triggering a registrar protocol interaction for a Wi-Fi configuration is optimized.

Optionally, the probe request includes the identifier of the access point, and the identifier indicates a target access point receiving the probe request. The probe request may further include a signal strength threshold specified by the station, and the signal strength threshold indicates a signal strength needing to be achieved by the probe request received by the access point. The signal strength threshold specified by the station that is included in the probe request may be a specific numerical value of the signal strength threshold, or may be a code indicating the signal strength threshold. The target access point receiving the probe request includes a correspondence between a code of the signal strength threshold and a specific numerical value of the signal strength threshold, and the numerical value corresponding to the signal strength threshold may be obtained by using the code of the signal strength threshold. Optionally, the probe request may further include a release of a triggered registrar protocol interaction for the WSC, and the access point is notified of the release of the triggered registrar protocol used by the station sending the probe request, so that the access point correctly parses the probe request according to the release. If a release value, which is included in the probe request, of the triggered registrar protocol is the same as a release value used by the access point, the protocols exchanged between the access point and the station are consistent, that is, the access point can parse the probe request according to a meaning of a field defined in the protocol of this release. If the protocols are inconsistent, the access point may obtain, according to the release value, a meaning of a field defined in the corresponding protocol, to correctly parse the field. If the meaning cannot be obtained, parsing cannot be performed, and the probe request may be discarded. Optionally, the probe request may further include vendor information. The vendor information may be used to notify a vendor of the station to the access point, and the vendor information may also be used to help the access point parse the probe request. For example, protocol types and protocol releases used by different vendors may be different. After receiving the probe request, the access point may obtain, by using vendor information, a protocol corresponding to the probe request, or obtain, with reference to vendor information and a release value of a protocol, a protocol corresponding to the probe request, to obtain a meaning of each field of the probe request, so that the probe request is correctly parsed.

Optionally, the signal strength threshold may be a signal strength threshold indicated by the probe request, or may be a signal strength threshold specified by the access point. The signal strength threshold specified by the access point may be a signal strength threshold directly saved by the access point, or may be a signal strength threshold that is obtained by the access point by means of a related setting. The signal strength threshold specified by the access point is not limited in the present disclosure.

In an optional implementation manner, the determining, by the access point, a first station in the at least one station according to the probe request sent by the at least one station includes: sorting, by the access point, according to a signal strength of the probe request sent by the at least one station, and determining a probe request whose signal strength is greater than the signal strength threshold; and if the identifier included in the probe request whose signal strength is greater than the signal strength threshold matches the identifier of the access point, determining that a station sending the probe request whose signal strength is greater than the signal strength threshold is used as the first station.

Optionally, the determined probe request whose signal strength is greater than the signal strength threshold may be a probe request whose signal strength is greater than the signal strength threshold and whose signal strength is the highest, or may be any one of probe requests whose signal strengths are greater than the signal strength threshold. A specific method for determining the probe request whose signal strength is greater than the signal strength threshold may be set and adjusted according to an actual situation, and is not limited in the present disclosure. Optionally, if the determined probe request whose signal strength is greater than the signal strength threshold does not meet a requirement of subsequent determining, for example, the identifier included in the probe request does not match the access point, a probe request may be determined then in other probe requests whose signal strengths are greater than the signal strength threshold, to continue performing determining.

In an optional implementation manner, the determining, by the access point, a first station in the at least one station according to the probe request sent by the at least one station includes: determining, by the access point according to the probe request sent by the at least one station, the probe request that includes the identifier of the target access point matching the identifier of the access point; and if the signal strength of the probe request that includes the identifier of the target access point matching the identifier of the access point is greater than the signal strength threshold, determining that a station sending the probe request that includes the identifier of the target access point matching the identifier of the access point is used as the first station.

If the signal strength of the determined probe request that includes the identifier of the target access point matching the identifier of the access point is less than the signal strength threshold, the probe request is discarded. It is determined whether a signal strength of a probe request that is sent by another station and that includes the identifier of the target access point matching the identifier of the access point is greater than the signal strength threshold. A first station meeting the determining that the signal strength is greater than the signal strength threshold is determined. If no probe request meets the foregoing requirement, a registrar protocol interaction between the access point and the station cannot be automatically triggered.

The access point performs determining and processing on multiple received probe requests, avoiding interaction conflicts between the access point and multiple stations, and effectively ensuring a process of automatically triggering a registrar protocol interaction.

In an optional implementation manner, after the determining, by the access point, a first station in the at least one station according to the probe request sent by the at least one station, the method further includes: sending a probe response to the first station, where the probe response is used by the first station to automatically trigger a registrar protocol interaction between the access point and the first station.

The probe response is a response to the probe request. The probe response includes an identifier of the first station, and the identifier indicates a target station. Optionally, the probe response may further include the signal strength threshold specified by the access point. A registrar protocol interaction is automatically triggered only when the specified signal strength threshold is used to indicate a signal strength threshold needing to be achieved by the probe response received by the first station. The signal strength threshold specified by the access point that is included in the probe response may be a specific numerical value of the signal strength threshold, or may be a code indicating the signal strength threshold. A target station receiving the probe response includes a correspondence between a code of the signal strength threshold and a specific numerical value of the signal strength threshold, and the numerical value corresponding to the signal strength threshold may be obtained by using the code of the signal strength threshold. Optionally, the probe response may not include the signal strength threshold specified by the access point. After receiving the probe response, the first station determines whether a signal strength of the probe response is greater than the signal strength threshold, where the signal strength threshold is a signal strength threshold specified by the first station.

After the probe request received by the access point meets the requirement, the probe response is sent to the first station, so that the first station and the access point synchronously trigger a registrar protocol, improving security and stability, and further ensuring the process of automatically triggering the registrar protocol.

In an optional implementation manner, before S104, the method further includes: sending, by the access point, a broadcast message.

After being powered on, the access point sends a broadcast message to the surrounding. The broadcast message may be a beacon frame sent by the access point. Optionally, the broadcast message may include the signal strength threshold specified by the access point, and the specified signal strength threshold indicates a lowest requirement on a signal strength that the station needs to achieve when receiving the broadcast message. Optionally, the broadcast message may further include an identifier of the target station, and the identifier indicates the station responding to the broadcast message. Optionally, the broadcast message may further include a release of a triggered registrar protocol for the WSC, and the station is notified of the release of the triggered protocol used by the station sending the broadcast message, so that the station correctly parses the broadcast message according to the release. If a release value, which is included in the broadcast message, of the triggered registrar protocol is the same as a release value used by the station, the protocols exchanged between the station and the access point are consistent, that is, the station can parse the broadcast message according to a meaning of a field defined in the protocol of this release. If the protocols are inconsistent, the station may obtain, according to the release value, a meaning of a field defined in the corresponding protocol, to correctly parse the field. If the meaning cannot be obtained, parsing cannot be performed, and the broadcast message may be discarded. Optionally, the broadcast message may further include vendor information. The vendor information may be used to notify, to the station, a vendor of the access point, and the vendor information may also be used to help the station parse the broadcast message. For example, protocol types and protocol releases used by different vendors may be different. After receiving the broadcast message, the station may obtain, by using vendor information, a protocol corresponding to the broadcast message, or obtain, with reference to vendor information and a release value of a protocol, a protocol corresponding to the broadcast message, to obtain a meaning of each field of the broadcast message, so that the broadcast message is correctly parsed.

The broadcast message may be used to help find, through searching, the target station that matches the access point, implementing initial matching between an access point and a station that automatically trigger the registrar protocol.

Figure 8:
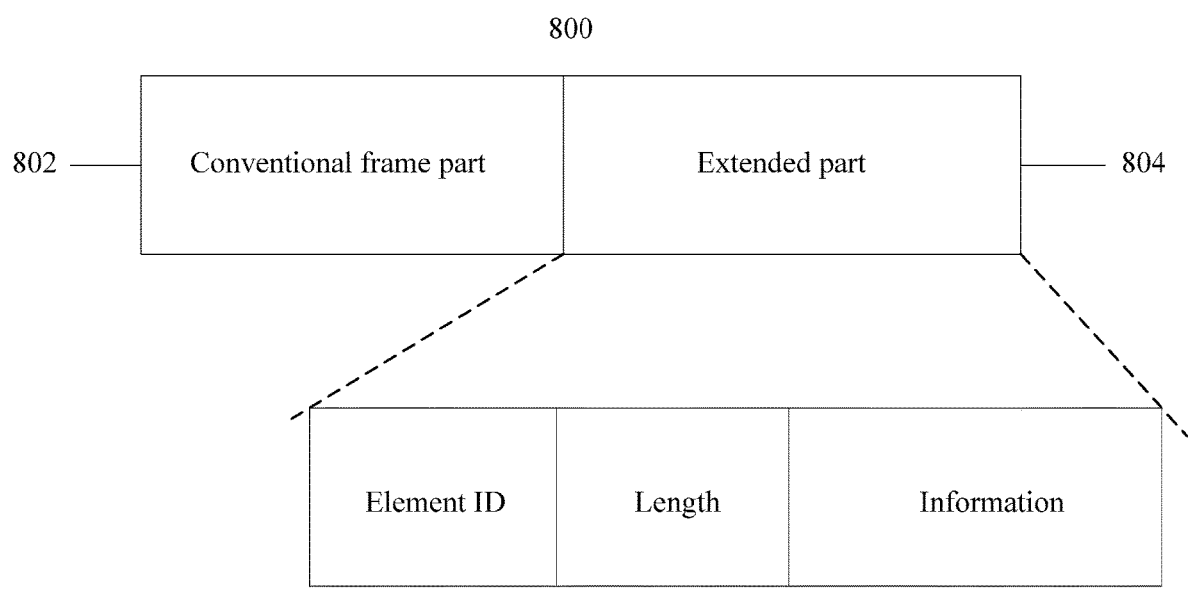
FIG. 8 is a schematic diagram of a frame structure of a management frame according to Embodiment 8 of the present disclosure.

The foregoing probe request, probe response, and broadcast message may be of a frame structure of a management frame shown in FIG. 8. The identifier of the access point, the identifier of the station, the signal strength threshold, the release of the triggered registrar protocol for the WSC, the vendor information, and the like that are included in the probe request, the probe response, and the broadcast message may all be carried in an information part of an extended part 804.

Figure 2A:
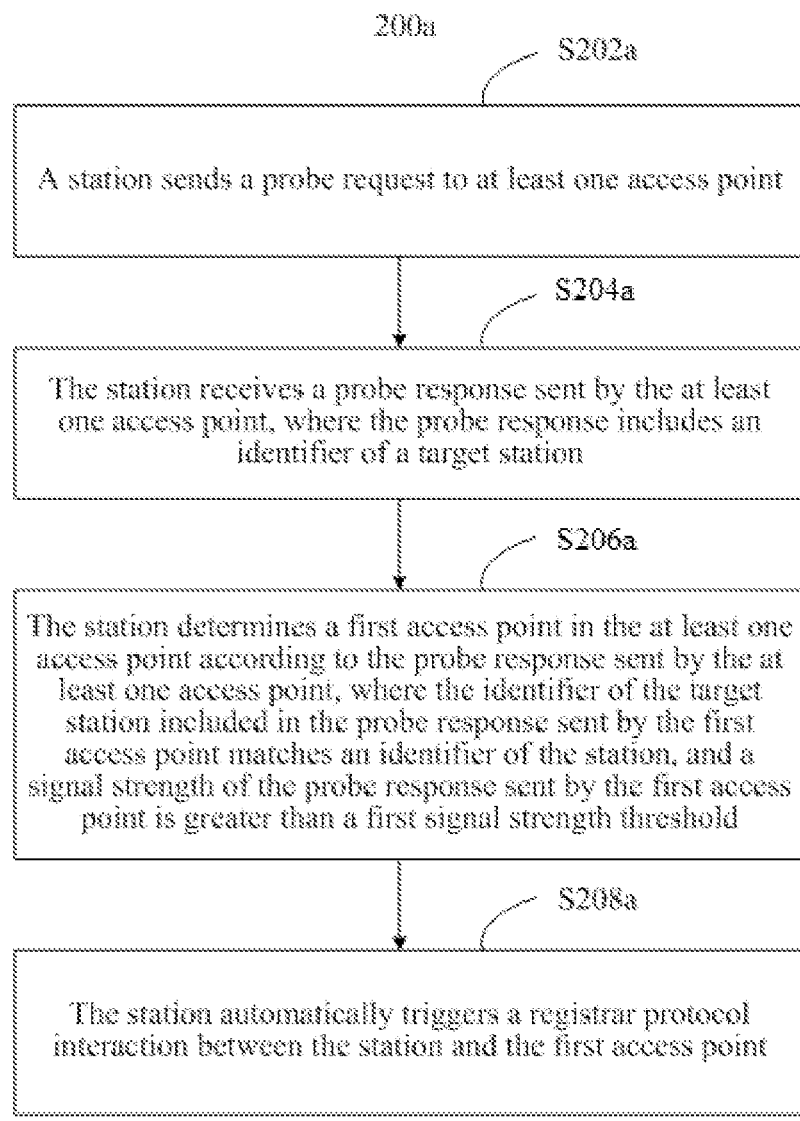
FIG. 2A is a schematic flowchart of a method for triggering a registrar protocol interaction according to Embodiment 2 of the present disclosure.

Embodiment 2 of the present disclosure provides a method for triggering a registrar protocol interaction, used for performing a wireless simple configuration between an access point and at least one station. As shown in FIG. 2A, the method 200a includes:

S202a: The station sends a probe request to the at least one access point.

S204a: The station receives a probe response sent by the at least one access point, where the probe response includes an identifier of a target station.

S206a: The station determines a first access point in the at least one access point according to the probe response sent by the at least one access point, where the identifier of the target station included in the probe response sent by the first access point matches an identifier of the station, and a signal strength of the probe response sent by the first access point is greater than a first signal strength threshold.

S208a: The station automatically triggers a registrar protocol interaction between the station and the first access point.

In an optional implementation manner, the target station may be a station establishing a connection to the at least one access point. The probe response sent by the at least one access point includes the identifier of the target station, indicating that the at least one access point clearly learns that a station establishing a connection to the at least one access point sends, in a directed manner, the probe response to the target station establishing a connection. That the identifier of the target station included in the probe response sent by the first access point matches the identifier of the station may be: the identifier of the target station is the same as the identifier of the station. For example, the identifier of the target station may be a physical MAC address of the target station, and the MAC address of the target station is the same as a MAC address of the station. Alternatively, the identifier of the target station may be an identifier code, and an identifier corresponding to the identifier code is the same as the identifier of the station. A specific implementation manner in which the identifier of the target station matches the identifier of the station is not limited in the present disclosure.

In an optional implementation manner, after determining the first access point in the at least one access point according to the probe response sent by the at least one access point, the station directly and automatically triggers a registrar protocol interaction between the station and the first access point. "Directly" refers to that the station can trigger a registrar protocol interaction between the station and the first access point after determining the first access point, without needing to perform other processing, for example, determining of another condition. That the station automatically triggering a registrar protocol interaction between the station and the first access point may be that the station triggers a registrar protocol interaction mechanism, and when receiving a registrar protocol message of the first access point, the station responds to the message; or may be that the station initiates a related message of a registrar protocol interaction, such as a request, to the first access point. A process of the registrar protocol interaction is not limited in the present disclosure. Optionally, an access point that sends the probe request including the identifier of the target station that matches the identifier of the station and that sends the probe response whose signal strength is equal to the first signal strength threshold may also be used as the first access point.

According to the method for triggering a registrar protocol interaction for a WSC provided in this embodiment, after receiving a probe response, a station determines that an identifier included in the probe response matches an identifier of the station and that a signal strength of the probe response is greater than a signal strength threshold. In this way, matching between a station and an access point is implemented, a registrar protocol is automatically triggered, and a process of triggering a registrar protocol interaction for a Wi-Fi configuration is optimized.

Optionally, the probe response includes the identifier of the target station, and the identifier indicates a station establishing a connection to the access point. The probe response may further include a signal strength threshold, and the signal strength threshold indicates a signal strength needing to be achieved by the probe response received by the station.

The first signal strength threshold may be the signal strength threshold indicated by the probe response, or may be a signal strength threshold specified by the station. The signal strength threshold specified by the station may be a signal strength threshold directly saved by the station, or may be a signal strength threshold that is obtained by the station by means of a related setting. The signal strength threshold specified by the station is not limited in the present disclosure.

In an optional implementation manner, the determining, by the station, a first access point in the at least one access point according to the probe response sent by the at least one access point includes: performing, by the station, sorting according to a signal strength of the probe response sent by the at least one access point, and determining a probe response whose signal strength is greater than the first signal strength threshold; and if the identifier of the target station included in the probe response whose signal strength is greater than the first signal strength threshold matches the identifier of the station, determining that an access point sending the probe response whose signal strength is greater than the first signal strength threshold is used as the first access point.

Optionally, the determined probe response whose signal strength is greater than the first signal strength threshold may be a probe response whose signal strength is greater than the first signal strength threshold and whose signal strength is the highest, or may be any one of probe responses whose signal strengths are greater than the first signal strength threshold. A specific method for determining the probe response whose signal strength is greater than the first signal strength threshold may be set and adjusted according to an actual situation, and is not limited in the present disclosure. Optionally, if the determined probe response whose signal strength is greater than the first signal strength threshold does not meet a requirement of subsequent determining, for example, the identifier of the target station included in the probe response does not match the station, a probe response may be determined then in other probe responses whose signal strengths are greater than the signal strength threshold, to continue performing determining.

In an optional implementation manner, the determining, by the station, a first access point in the at least one access point according to the probe response sent by the at least one access point includes: determining, by the station according to the probe response sent by the at least one access point, a probe response that includes the identifier of the target station that matches the identifier of the station; and if the signal strength of the probe response that includes the identifier of the target station that matches the identifier of the station is greater than the first signal strength threshold, determining that an access point for the probe response that includes the identifier of the target station that matches the identifier of the station is used as the first access point.

If the signal strength of the determined probe response that includes the identifier of the target station that matches the identifier of the station is less than the first signal strength threshold, the probe response is discarded. It is determined that determining of whether a signal strength is greater than the first signal strength threshold is performed on a probe response that is sent by another access point and that includes the identifier of the target station that matches the identifier of the station. A first access point meeting the determining that the signal strength is greater than the first signal strength threshold is determined. If no probe response meets the foregoing requirement, a registrar protocol interaction between the station and the first access point cannot be automatically triggered.

In an optional implementation manner, before the station receives the probe response sent by the at least one access point, the method further includes: receiving, by the station, a broadcast message sent by the first access point; and when determining that a signal strength of the broadcast message is greater than a second signal strength threshold, sending, by the station, a probe request to the first access point, where the probe request includes an identifier of the first access point, and is used by the first access point to trigger a registrar protocol interaction with the station; and the probe response is a response to the probe request.

In an optional implementation manner, the second signal strength threshold is a signal strength threshold indicated by the broadcast message, or may be the signal strength threshold specified by the station.

After being powered on, if the station currently accesses no access point, the station automatically scans an ambient access point signal. The station receives the broadcast message sent by the access point, where the broadcast message may be a beacon frame sent by the access point. Optionally, the broadcast message includes the signal strength threshold, and the signal strength threshold indicates a lowest requirement needing to be achieved by the signal strength of the broadcast message received by the station.

In an optional implementation manner, the station may receive broadcast messages of multiple access points, and before the station determines that the signal strength of the broadcast message is greater than the second signal strength threshold, the method further includes: performing, by the station, sorting according to a signal strength of a broadcast message sent by the at least one access point, and determining the broadcast message whose signal strength is greater than the second signal strength threshold, where the identifier included in the probe request is an identifier of the access point sending the determined broadcast message whose signal strength is greater than the second signal strength threshold.

Optionally, the broadcast message whose signal strength is greater than the second signal strength threshold may be a broadcast message whose signal strength is the highest, or may be any one of broadcast messages whose signal strengths set by the station are higher than a predetermined value. The determined broadcast message whose signal strength is greater than the second signal strength threshold may be set and adjusted according to an actual situation, and is not limited in the present disclosure.

Optionally, the first signal strength threshold and the second signal strength threshold may be a same value or may be different values.

The station performs determining and processing on multiple received broadcast messages, avoiding interaction conflicts between the station and multiple access points, and effectively ensuring a process of automatically triggering a registrar protocol.

Figure 2B:
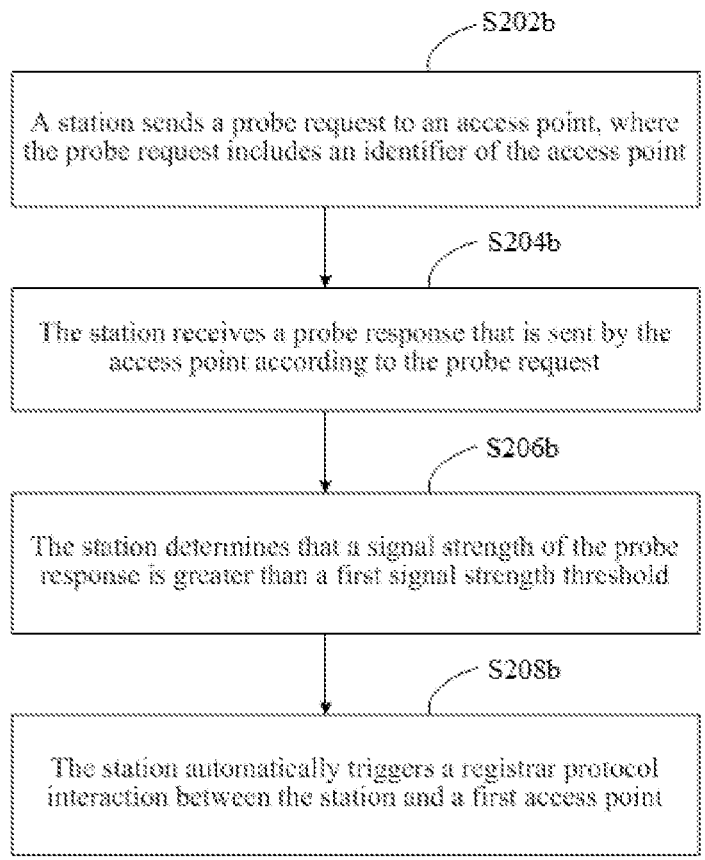
FIG. 2B is a schematic flowchart of a method for triggering a registrar protocol interaction according to Embodiment 2 of the present disclosure.

The method 200a may be a solution when the station does not clearly learn that the station is connected to which access point to trigger a registrar protocol interaction. In an optional implementation manner, the station clearly learns a corresponding access point triggering a registrar protocol interaction. As shown in FIG. 2B, a method 200b for triggering a registrar protocol interaction is used to perform a wireless simple configuration between a station and an access point, and includes:

S202b: The station sends a probe request to the access point, where the probe request includes an identifier of the access point.

S204b: The station receives a probe response that is sent by the access point according to the probe request.

S206b: The station determines that a signal strength of the probe response is greater than a first signal strength threshold.

S208b: The station automatically triggers a registrar protocol interaction between the station and the first access point.

The first signal strength threshold may be a signal strength threshold indicated by the probe response, or may be a signal strength threshold specified by the station, and is the same as the first signal strength threshold in the method 200a.

In an optional implementation manner, before the station sends the probe request to the access point, the method 200b further includes: receiving, by the station, a broadcast message sent by the access point; and when determining that a signal strength of the broadcast message is greater than a second signal strength threshold, sending, by the station, the probe request to the access point.

Optionally, the first signal strength threshold and the second signal strength threshold may be a same value or may be different values.

The foregoing probe request, probe response, and broadcast message may be of a frame structure of a management frame shown in FIG. 8. The identifier of the access point, an identifier of the station, the signal strength threshold, a release of a triggered registrar protocol for the WSC, vendor information, and the like that are included in the probe request, the probe response, and the broadcast message may all be carried in an information part of an extended part 804.

Figure 3:
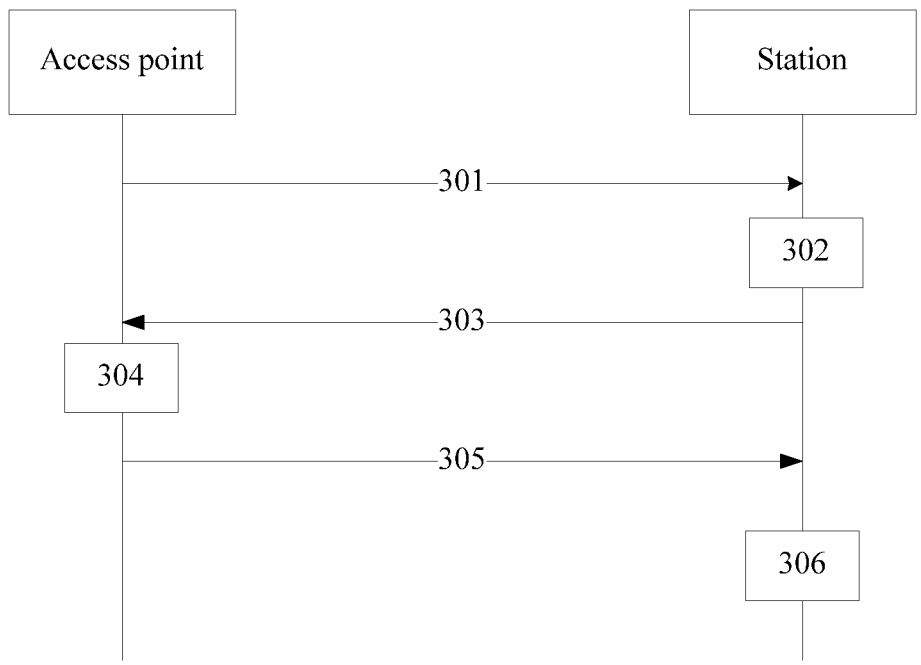
FIG. 3 is a schematic signaling interaction diagram of a method for triggering a registrar protocol interaction according to Embodiment 3 of the present disclosure.

Embodiment 3 of the present disclosure provides a WSC triggering method. The triggering method provided in this embodiment of the present disclosure is applicable to a product that automatically conforms to a standard by means of a Wi-Fi WSC, and the standard may include, but is not limited to, The Institute of Electrical and Electronics Engineers (IEEE) 802.11 and a WSC standard of the Wi-Fi Alliance. As an example, based on the IEEE 802.11 standard, a schematic signaling interaction diagram of automatic triggering of a WSC between an access point and a station is shown in FIG. 3. Descriptions and illustrations of Embodiment 1 and Embodiment 2 are all applicable to this embodiment, and related content is not further described. Automatic triggering of a WSC specifically includes:

301: An access point is powered on, and sends a beacon frame.

After being powered on, the access point sends a broadcast message, for example, a beacon frame. In an optional implementation manner, the beacon frame may carry an extended information element (IE) to implement automatic triggering. Optionally, the broadcast message may include a signal strength threshold, and the signal strength threshold indicates a lowest requirement on a signal strength that the station needs to achieve when receiving the broadcast message. Optionally, the broadcast message may further include an identifier of a target station, and the identifier indicates the station responding to the broadcast message. Optionally, the broadcast message may further include a release of a triggered registrar protocol. Optionally, the broadcast message may further include vendor information.

302: A station is powered on, and receives the beacon frame from the access point.

The station is powered on, and if the station currently accesses no access point, the station automatically scans an ambient access point signal, receives the broadcast message of the access point, for example, the beacon frame, and matches the access point by parsing the beacon frame.

After receiving the beacon frame, the station parses the beacon frame, and determines whether a signal strength of the beacon frame is greater than a signal strength threshold. The signal strength threshold may be a signal strength threshold indicated by the broadcast message, or may be a signal strength threshold specified by the station. Optionally, if receiving beacon frames of multiple access points, the station may sort access points supporting automatic triggering of a registrar protocol interaction in descending order of signal strengths, and determine a beacon frame whose signal strength is greater than the signal strength threshold, for example, a beacon frame whose signal strength is the highest.

Optionally, the station further obtains a release, which is in the broadcast message, of an automatically triggered registrar protocol, to further ensure correctness of parsing the beacon frame.

Optionally, the station further obtains the vendor information in the broadcast message, to further ensure correctness of parsing the beacon frame.

303: The station sends a probe request frame.

If detecting that a matching condition described in 302 is met, the station sends the probe request frame to the access point, to instruct the access point to automatically trigger a registrar protocol interaction for the WSC.

In an optional implementation manner, the probe request frame may automatically trigger a registrar protocol for the WSC by using the extended IE. The probe request frame sent by the station includes an identifier of a target access point, and further includes a signal strength threshold. Optionally, the probe request may further include a release of a triggered protocol for the WSC, and the access point is notified of the release of the triggered protocol used by the station sending the probe request, so that the access point correctly parses the probe request according to the release, and may further determine, according to the release, whether protocols exchanged between the access point and the station are consistent. Optionally, the probe request may further include vendor information, and the vendor information may be used to notify a vendor of the station to the access point. If triggered protocols used by different vendors are different, the vendor information may also be used to help the access point parse the probe request.

304: The access point receives the probe request frame.

The access point receives the probe request frame, parses the probe request frame, and determines whether the identifier included in the probe request matches the identifier of the access point, and whether a signal strength of the probe request is greater than the signal strength threshold. The signal strength threshold may be a signal strength threshold indicated by the probe request, or may be a signal strength threshold specified by the access point. Optionally, the signal strength threshold indicated by the probe request frame of the station is not less than the signal strength threshold specified by the access point, so that configuration security is further ensured.

Optionally, the access point further obtains the release, which is in the probe request frame, of the automatically triggered registrar protocol, to correctly parse the probe request frame.

Optionally, the access point further obtains vendor information in the probe request frame, to correctly parse the probe request frame.

305: The access point automatically triggers a registrar protocol for a WSC, and sends a probe response frame to the station.

If the identifier included in the probe request matches the identifier of the access point, the signal strength of the probe request is greater than the signal strength threshold, and the access point is not performing a registrar protocol interaction for the WSC, the registrar protocol is triggered, and the probe response frame is sent to the station, to instruct the station to synchronously trigger the registrar protocol.

In an optional implementation manner, the probe response frame sent by the access point may synchronize with the station by using the extended IE. The probe response frame sent by the access point includes an identifier of a target station, and further includes a signal strength threshold.

306: The station receives the probe response frame; and when determining that the identifier matches an identifier of the station, and a signal strength of the probe request is greater than a signal strength threshold, automatically triggers the registrar protocol.

It is determined whether the identifier included in the probe response frame matches the identifier of the station, and whether the signal strength of the probe response frame is greater than the signal strength threshold. If the condition is met, the registrar protocol is automatically triggered, and the process of a registrar protocol interaction for the WSC is not limited in the present disclosure. If the condition is not met, the probe response is discarded.

The beacon frame, the probe request frame, the probe response frame, and the like that are sent between the access point and the station may all be referred to as management frames. Optionally, the access point and the station may implement automatic triggering of a registrar protocol interaction for the WSC by adding an extended IE to the beacon frame, the probe request frame, and the probe response frame. The foregoing probe request, probe response, and broadcast message may be of a frame structure of a management frame shown in FIG. 8. The identifier of the access point, the identifier of the station, the signal strength threshold, the release of the triggered registrar protocol for the WSC, the vendor information, and the like that are included in the probe request, the probe response, and the broadcast message may all be carried in an information part of an extended part 804.

According to the method for triggering a registrar protocol for a WSC provided in this embodiment, that an access point matches a station is implemented based on a signal strength, a registrar protocol is automatically triggered, and a process of triggering the registrar protocol for a Wi-Fi configuration is optimized.

Figure 4:
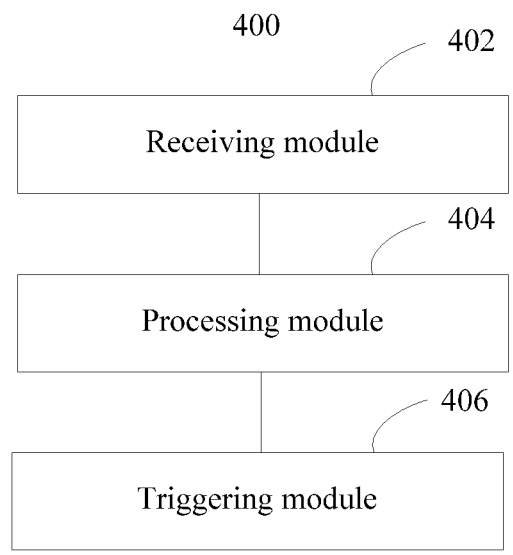
FIG. 4 is a schematic structural diagram of an access point according to Embodiment 4 of the present disclosure.

Embodiment 4 of the present disclosure provides an access point 400. A structural diagram of the access point 400 is shown in FIG. 4, and the access point 400 is used to perform the methods of the access point in Embodiment 1 and Embodiment 3. All solutions and characteristics that can be implemented by the access point in Embodiment 1 and Embodiment 3 are applicable to this embodiment, and are not described herein again.

The access point 400 includes: a receiving module 402 configured to receive a probe request sent by the at least one station, where the probe request includes an identifier of the access point; a processing module 404 configured to determine a first station in the at least one station according to the probe request sent by the at least one station, where the identifier included in the probe request sent by the first station matches the identifier of the access point, and a signal strength of the probe request sent by the first station is greater than a signal strength threshold; and a triggering module 406 configured to automatically trigger a registrar protocol interaction between the access point and the first station.

In an optional implementation manner, that an identifier of the first access point included in the probe request sent by the first station matches the identifier of the access point may be: the identifier of the first access point is the same as the identifier of the access point. For example, the identifier of the first access point may be a physical MAC address of the first access point, and the MAC address of the first access point is the same as a MAC address of the access point. Alternatively, the identifier of the first access point may be an identifier code, and an identifier corresponding to the identifier code is the same as the identifier of the access point. A specific implementation manner in which the identifier of the first access point matches the identifier of the access point is not limited in the present disclosure.

In an optional implementation manner, after the processing module 404 determines the first station in the at least one station according to the probe request sent by the at least one station, the triggering module 406 directly and automatically triggers a registrar protocol interaction between the access point and the first station. "Directly" refers to that the access point can trigger a registrar protocol interaction between the access point and the first station after determining the first station, without needing to perform other processing. The automatically triggering a registrar protocol interaction between the access point and the first station may be triggering a registrar protocol interaction mechanism, and when a registrar protocol message of the first station is received, the message is responded to; or may be initiating a related message of a registrar protocol interaction, such as a request, to the first station. A process of the registrar protocol interaction is not limited in the present disclosure. Optionally, the first station can be the station that the identifier of the first access point included in the probe request sent by the determined station matches the identifier of the access point, and the signal strength of the probe request sent by the first station is equal to the signal strength threshold.

The access point provided in this embodiment determines that an identifier included in a probe request sent by a first station matches the access point and that a signal strength of the probe request is greater than a signal strength threshold. In this way, matching between a station and an access point is implemented, a registrar protocol is automatically triggered, and a process of triggering a registrar protocol interaction for a Wi-Fi configuration is optimized.

Optionally, the probe request includes the identifier of the access point, and the identifier indicates a target access point receiving the probe request. The probe request may further include a signal strength threshold specified by the station, and the signal strength threshold indicates a signal strength needing to be achieved by the probe request received by the access point. The signal strength threshold specified by the station that is included in the probe request may be a specific numerical value of the signal strength threshold, or may be a code indicating the signal strength threshold. The target access point receiving the probe request includes a correspondence between a code of the signal strength threshold and a specific numerical value of the signal strength threshold, and the numerical value corresponding to the signal strength threshold may be obtained by using the code of the signal strength threshold. Optionally, the probe request may further include a release of a triggered registrar protocol interaction for the WSC, and the access point is notified of the release of the triggered registrar protocol used by the station sending the probe request, so that the access point correctly parses the probe request according to the release. If a release value, which is included in the probe request, of the triggered registrar protocol is the same as a release value used by the access point, the protocols exchanged between the access point and the station are consistent, that is, the access point can parse the probe request according to a meaning of a field defined in the protocol of this release. If the protocols are inconsistent, the access point may obtain, according to the release value, a meaning of a field defined in the corresponding protocol, to correctly parse the field. If the meaning cannot be obtained, parsing cannot be performed, and the probe request may be discarded. Optionally, the probe request may further include vendor information. The vendor information may be used to notify a vendor of the station to the access point, and the vendor information may also be used to help the access point parse the probe request. For example, protocol types and protocol releases used by different vendors may be different. After receiving the probe request, the access point may obtain, by using vendor information, a protocol corresponding to the probe request, or obtain, with reference to vendor information and a release value of a protocol, a protocol corresponding to the probe request, to obtain a meaning of each field of the probe request, so that the probe request is correctly parsed.

Optionally, the signal strength threshold may be a signal strength threshold indicated by the probe request, or may be a signal strength threshold specified by the access point. The signal strength threshold specified by the access point may be a signal strength threshold directly saved by the access point, or may be a signal strength threshold that is obtained by the access point by means of a related setting. The signal strength threshold specified by the access point is not limited in the present disclosure.

In an optional implementation manner, the determining, by the processing module 404, a first station in the at least one station according to the probe request sent by the at least one station includes: performing, by the processing module 404, sorting according to a signal strength of the probe request sent by the at least one station, and determining a probe request whose signal strength is greater than the signal strength threshold; and if the identifier included in the probe request whose signal strength is greater than the signal strength threshold matches the identifier of the access point, determining that a station sending the probe request whose signal strength is greater than the signal strength threshold is used as the first station.

Optionally, the determined probe request whose signal strength is greater than the signal strength threshold may be a probe request whose signal strength is greater than the signal strength threshold and whose signal strength is the highest, or may be any one of probe requests whose signal strengths are greater than the signal strength threshold. A specific method for determining the probe request whose signal strength is greater than the signal strength threshold may be set and adjusted according to an actual situation, and is not limited in the present disclosure. Optionally, if the determined probe request whose signal strength is greater than the signal strength threshold does not meet a requirement of subsequent determining, for example, the identifier included in the probe request does not match the access point, a probe request may be determined then in other probe requests whose signal strengths are greater than the signal strength threshold, to continue performing determining.

In an optional implementation manner, the determining, by the processing module 404, a first station in the at least one station according to the probe request sent by the at least one station includes: determining, by the processing module 404 according to the probe request sent by the at least one station, the probe request that includes the identifier of the first access point matching the identifier of the access point; and if the signal strength of the probe request that includes the identifier of the first access point matching the identifier of the access point is greater than the signal strength threshold, determining that a station sending the probe request that includes the identifier of the first access point matching the identifier of the access point is used as the first station.

If the signal strength of the determined probe request that includes the identifier of the first access point matching the identifier of the access point is less than the signal strength threshold, the probe request is discarded. It is determined that determining of whether a signal strength is greater than the signal strength threshold is performed on a probe request that is sent by another station and that includes the identifier of the first access point matching the identifier of the access point. A first station meeting the determining that the signal strength is greater than the signal strength threshold is determined. If no probe request meets the foregoing requirement, a registrar protocol interaction between the access point and the station cannot be automatically triggered.

The access point performs determining and processing on multiple received probe requests, avoiding interaction conflicts between the access point and multiple stations, and effectively ensuring a process of automatically triggering a registrar protocol.

In an optional implementation manner, the access point further includes a sending module. After the processing module 404 determines the first station in the at least one station according to the probe request sent by the at least one station, the sending module is configured to send a probe response to the first station, where the probe response is used by the first station to automatically trigger a registrar protocol interaction between the access point and the first station.

The probe response is a response to the probe request. The probe response includes an identifier of the first station, and the identifier indicates a target station. Optionally, the probe response may further include the signal strength threshold specified by the access point. A registrar protocol interaction is automatically triggered only when the specified signal strength threshold is used to indicate a signal strength threshold needing to be achieved by the probe response received by the first station. The signal strength threshold specified by the access point that is included in the probe response may be a specific numerical value of the signal strength threshold, or may be a code indicating the signal strength threshold. A target station receiving the probe response includes a correspondence between a code of the signal strength threshold and a specific numerical value of the signal strength threshold, and the numerical value corresponding to the signal strength threshold may be obtained by using the code of the signal strength threshold. Optionally, the probe response may not include the signal strength threshold specified by the access point. After receiving the probe response, the first station determines whether a signal strength of the probe response is greater than the signal strength threshold, where the signal strength threshold is a signal strength threshold specified by the first station.

After the probe request received by the receiving module meets the requirement, the sending module sends the probe response to the corresponding station, so that the station and the access point synchronously trigger a registrar protocol, improving security and stability, and further ensuring the process of automatically triggering the registrar protocol.

In an optional implementation manner, before the receiving module receives the probe request sent by the station, the sending module further sends a broadcast message. Optionally, the broadcast message includes the signal strength threshold, and the signal strength threshold indicates a lowest requirement on a signal strength that the station needs to achieve when receiving the broadcast message. Optionally, the broadcast message further includes an address of the target station, and the address indicates the station responding to the broadcast message. Optionally, the broadcast message may further include a release of a triggered protocol for a WSC, and it is determined that exchanged protocols are consistent. Optionally, the broadcast message may further include vendor information.

The broadcast message may be used to help find, through searching, the target station that matches the access point, implementing initial matching between an access point and a station that automatically trigger the registrar protocol.

The foregoing probe request, probe response, and broadcast message may be of a frame structure of a management frame shown in FIG. 8. The identifier of the access point, the identifier of the station, the signal strength threshold, the release of the triggered registrar protocol for the WSC, the vendor information, and the like that are included in the probe request, the probe response, and the broadcast message may all be carried in an information part of an extended part 804.

Figure 5A:
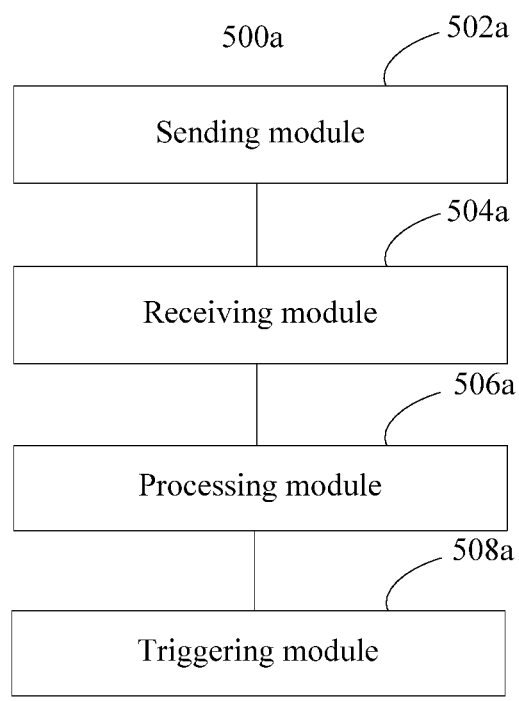
FIG. 5A is a schematic structural diagram of a station according to Embodiment 5 of the present disclosure.
Figure 5B:
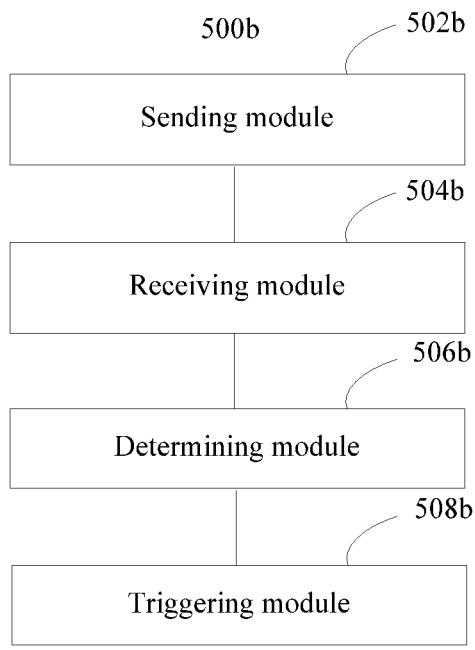
FIG. 5B is a schematic structural diagram of a station according to Embodiment 5 of the present disclosure.

Embodiment 5 of the present disclosure provides a station 500*a*. A structural diagram of the station 500*a* is shown in FIG. 5A, and the station 500*a* is used to perform the methods of the station in Embodiment 2 and Embodiment 3. All solutions and characteristics that can be implemented by the station in Embodiment 2 and Embodiment 3 are applicable to this embodiment, and are not described herein again.

The station 500*a* includes: a sending module 502*a* configured to send a probe request to the at least one access point; a receiving module 504*a* configured to receive a probe response sent by the at least one access point, where the probe response includes an identifier of a target station; a processing module 506a configured to determine a first access point in the at least one access point according to the probe response sent by the at least one access point, where the identifier of the target station included in the probe response sent by the first access point matches an identifier of the station, and a signal strength of a probe request sent by the target station is greater than a first signal strength threshold; and a triggering module 508a configured to automatically trigger a registrar protocol interaction between the station and the first access point.

In an optional implementation manner, that the identifier of the target station included in the probe response sent by the first access point matches the identifier of the station may be: the identifier of the target station is the same as the identifier of the station. For example, the identifier of the target station may be a physical MAC address of the target station, and the MAC address of the target station is the same as a MAC address of the station. Alternatively, the identifier of the target station may be an identifier code, and an identifier corresponding to the identifier code is the same as the identifier of the station. A specific implementation manner in which the identifier of the target station matches the identifier of the station is not limited in the present disclosure.

In an optional implementation manner, after the processing module determines the first access point in the at least one access point according to the probe response sent by the at least one access point, the triggering module directly and automatically triggers a registrar protocol interaction between the station and the first access point. "Directly" refers to that the station can trigger a registrar protocol interaction between the station and the first access point after determining the first access point, without needing to perform other processing, for example, determining of another condition. The automatically triggering a registrar protocol interaction between the station and the first access point may be triggering a registrar protocol interaction mechanism, and when a registrar protocol message of the first access point is received, the message is responded to; or may be initiating a related message of a registrar protocol interaction, such as a request, to the first access point. A process of the registrar protocol interaction is not limited in the present disclosure. Optionally, an access point that sends the probe request including the identifier of the target station that matches the identifier of the station and that sends the probe response whose signal strength is equal to the first signal strength threshold may also be used as the first access point.

After receiving a probe response, the station provided in this embodiment determines that an identifier included in the probe response matches an identifier of the station and that a signal strength of the probe response is greater than a signal strength threshold. In this way, matching between a station and an access point is implemented, a registrar protocol is automatically triggered, and a process of triggering a registrar protocol interaction for a Wi-Fi configuration is optimized.

Optionally, the probe response includes the identifier of the target station, and the identifier indicates a station establishing a connection to the access point sending the probe response. The probe response may further include a signal strength threshold, and the signal strength threshold indicates a signal strength needing to be achieved by the probe response received by the station.

The first signal strength threshold may be the signal strength threshold indicated by the probe response, or may be a signal strength threshold specified by the station. The signal strength threshold specified by the station may be a signal strength threshold directly saved by the station, or may be a signal strength threshold that is obtained by the station by means of a related setting. The signal strength threshold specified by the station is not limited in the present disclosure.

In an optional implementation manner, the determining, by the processing module, a first access point in the at least one access point according to the probe response sent by the at least one access point includes: performing sorting according to a signal strength of the probe response sent by the at least one access point, and determining a probe response whose signal strength is greater than the first signal strength threshold; and if the identifier of the target station included in the probe response whose signal strength is greater than the first signal strength threshold matches the identifier of the station, determining that an access point sending the probe response whose signal strength is greater than the first signal strength threshold is used as the first access point.

Optionally, the determined probe response whose signal strength is greater than the first signal strength threshold may be a probe response whose signal strength is greater than the first signal strength threshold and whose signal strength is the highest, or may be any one of probe responses whose signal strengths are greater than the first signal strength threshold. A specific method for determining the probe response whose signal strength is greater than the first signal strength threshold may be set and adjusted according to an actual situation, and is not limited in the present disclosure. Optionally, if the determined probe response whose signal strength is greater than the first signal strength threshold does not meet a requirement of subsequent determining, for example, the identifier of the target station included in the probe response does not match the station, a probe response may be determined then in other probe responses whose signal strengths are greater than the signal strength threshold, to continue performing determining.

In an optional implementation manner, the determining, by the processing module, a first access point in the at least one access point according to the probe response sent by the at least one access point includes: determining, according to the probe response sent by the at least one access point, a probe response that includes the identifier of the target station that matches the identifier of the station; and if the signal strength of the probe response that includes the identifier of the target station that matches the identifier of the station is greater than the first signal strength threshold, determining that an access point for the probe response that includes the identifier of the target station that matches the identifier of the station is used as the first access point.

If the signal strength of the determined probe response that includes the identifier of the target station that matches the identifier of the station is less than the first signal strength threshold, the probe response is discarded. It is determined that determining of whether a signal strength is greater than the first signal strength threshold is performed on a probe response that is sent by another access point and that includes the identifier of the target station that matches the identifier of the station. A first access point meeting the determining that the signal strength is greater than the first signal strength threshold is determined. If no probe response meets the foregoing requirement, a registrar protocol interaction between the station and the first access point cannot be automatically triggered.

In an optional implementation manner, before receiving the probe response sent by the at least one access point, the receiving module is further configured to receive a broadcast message sent by the first access point.

The station further includes the sending module configured to: when the processing module determines that a signal strength of the broadcast message is greater than a second signal strength threshold, send a probe request to the first access point, where the probe request includes an identifier of the first access point, and is used by the first access point to trigger a registrar protocol interaction with the station; and the probe response is a response to the probe request.

In an optional implementation manner, the second signal strength threshold is a signal strength threshold indicated by the broadcast message, or may be the signal strength threshold specified by the station.

After being powered on, if the station currently accesses no access point, the station automatically scans an ambient access point signal. The receiving module receives the broadcast message sent by the access point, where the broadcast message may be a beacon frame sent by the access point. Optionally, the broadcast message includes the signal strength threshold, and the signal strength threshold indicates a lowest requirement needing to be achieved by the signal strength of the broadcast message received by the station.

In an optional implementation manner, the receiving module may receive broadcast messages of multiple access points, and before the processing module determines that the signal strength of the broadcast message is greater than the second signal strength threshold, the processing module is further configured to: sort according to a signal strength of a broadcast message sent by the at least one access point, and determine the broadcast message whose signal strength is greater than the second signal strength threshold, where the identifier included in the probe request is an identifier of the access point sending the determined broadcast message whose signal strength is greater than the second signal strength threshold.

Optionally, the broadcast message whose signal strength is greater than the second signal strength threshold may be a broadcast message whose signal strength is the highest, or may be any one of broadcast messages whose signal strengths set by the station are higher than a predetermined value. The determined broadcast message whose signal strength is greater than the second signal strength threshold may be set and adjusted according to an actual situation, and is not limited in the present disclosure.

Optionally, the first signal strength threshold and the second signal strength threshold may be a same value or may be different values.

The station performs determining and processing on multiple received broadcast messages, avoiding interaction conflicts between the station and multiple access points, and effectively ensuring a process of automatically triggering a registrar protocol.

The station 500a may be a solution when the station does not clearly learn that the station is connected to which access point to trigger a registrar protocol interaction. In an optional implementation manner, the station clearly learns a corresponding access point triggering a registrar protocol interaction. In an optional implementation manner, the present disclosure further provides a station 500b. The station includes: a sending module 502b configured to send a probe request to the access point, where the probe request includes an identifier of the access point; a receiving module 504b configured to receive a probe response that is sent by the access point according to the probe request; a determining module 506b configured to determine that a signal strength of the probe response is greater than a first signal strength threshold; and a triggering module 508b configured to automatically trigger a registrar protocol interaction between the station and the access point.

The first signal strength threshold may be a signal strength threshold indicated by the probe response, or may be a signal strength threshold specified by the station, and is the same as the first signal strength threshold in the method 200a.

In an optional implementation manner, before the station sends the probe request to the access point, the receiving module is further configured to receive a broadcast message sent by the access point; and when the determining module determines that a signal strength of the broadcast message is greater than a second signal strength threshold, the sending module sends the probe request to the access point.

Optionally, the first signal strength threshold and the second signal strength threshold may be a same value or may be different values.

The foregoing probe request, probe response, and broadcast message may be of a frame structure of a management frame shown in FIG. 8. The identifier of the access point, an identifier of the station, the signal strength threshold, a release of a triggered registrar protocol for a WSC, vendor information, and the like that are included in the probe request, the probe response, and the broadcast message may all be carried in an information part of an extended part 804.

Figure 6:
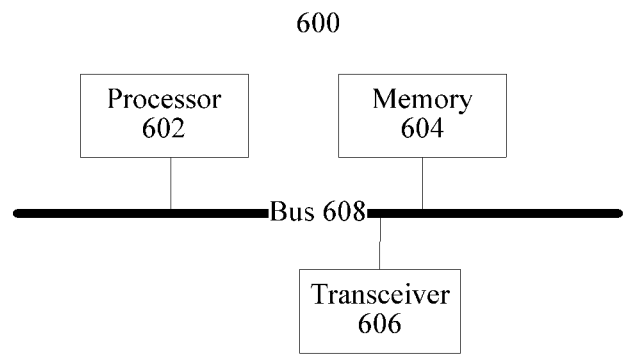
FIG. 6 is a schematic diagram of a hardware structure of an access point according to Embodiment 6 of the present disclosure.

FIG. 6 is a schematic diagram of a hardware structure of an access point according to Embodiment 6 of the present disclosure. The access point 600 includes a processor 602, a memory 604, and a transceiver 606. The processor 602, the memory 604, and the transceiver 606 communicate with each other by using a bus 608.

The transceiver 606 is configured to receive a message sent by the access point.

The memory 604 is configured to store an instruction.

The processor 602 is a control center of the access point, connects all parts of an entire computer by using various interfaces and lines, and performs various functions of a station and processes data by running or executing a software program and/or an application unit stored in the memory 604 and invoking data stored in the memory 604, so as to monitor the entire station.

Specifically, in an embodiment of the access point, as shown in FIG. 6, the access point includes: the transceiver 606 configured to receive a probe request sent by at least one station, where the probe request includes an identifier of a target access point; the processor 602 configured to determine a first station in the at least one station according to the probe request sent by the at least one station, where the identifier of the target access point included in the probe request sent by the first station matches an identifier of the access point, and a signal strength of the probe request sent by the first station is greater than a signal strength threshold; and the processor 602, further configured to automatically trigger a registrar protocol interaction between the access point and the first station.

In an optional implementation manner, that the identifier of the target access point included in the probe request sent by the first station matches the identifier of the access point may be: the identifier of the target access point may be the same as the identifier of the access point. For example, the identifier of the target access point may be a physical MAC address of the target access point, and the MAC address of the target access point is the same as a MAC address of the access point. Alternatively, the identifier of the target access point may be an identifier code, and an identifier corresponding to the identifier code is the same as the identifier of the access point. A specific implementation manner in which the identifier of the target access point matches the identifier of the access point is not limited in the present disclosure.

In an optional implementation manner, after determining the first station in the at least one station according to the probe request sent by the at least one station, the processor 602 directly and automatically triggers a registrar protocol interaction between the access point and the first station. "Directly" refers to that the processor 602 can trigger a registrar protocol interaction between the access point and the first station after determining the first station, without needing to perform other processing. The automatically triggering a registrar protocol interaction between the access point and the first station may be triggering a registrar protocol interaction mechanism, and when a registrar protocol message of the first station is received, the message is responded to; or may be initiating a related message of a registrar protocol interaction, such as a request, to the first station. A process of the registrar protocol interaction is not limited in the present disclosure. Optionally, the first station can be the station that the identifier of the target access point included in the probe request sent by the determined station matches the identifier of the access point, and the signal strength of the probe request sent by the first station is equal to the signal strength threshold.

The access point provided in this embodiment determines that an identifier included in a probe request sent by a first station matches the access point and that a signal strength of the probe request is greater than a signal strength threshold. In this way, matching between a station and an access point is implemented, a registrar protocol is automatically triggered, and a process of triggering a registrar protocol interaction for a Wi-Fi configuration is optimized.

Optionally, the probe request includes the identifier of the access point, and the identifier indicates a target access point receiving the probe request. The probe request may further include a signal strength threshold specified by the station, and the signal strength threshold indicates a signal strength needing to be achieved by the probe request received by the access point. The signal strength threshold specified by the station that is included in the probe request may be a specific numerical value of the signal strength threshold, or may be a code indicating the signal strength threshold. The target access point receiving the probe request includes a correspondence between a code of the signal strength threshold and a specific numerical value of the signal strength threshold, and the numerical value corresponding to the signal strength threshold may be obtained by using the code of the signal strength threshold. Optionally, the probe request may further include a release of a triggered registrar protocol interaction for the WSC, and the access point is notified of the release of the triggered registrar protocol used by the station sending the probe request, so that the access point correctly parses the probe request according to the release. If a release value, which is included in the probe request, of the triggered registrar protocol is the same as a release value used by the access point, the protocols exchanged between the access point and the station are consistent, that is, the access point can parse the probe request according to a meaning of a field defined in the protocol of this release. If the protocols are inconsistent, the access point may obtain, according to the release value, a meaning of a field defined in the corresponding protocol, to correctly parse the field. If the meaning cannot be obtained, parsing cannot be performed, and the probe request may be discarded. Optionally, the probe request may further include vendor information. The vendor information may be used to notify a vendor of the station to the access point, and the vendor information may also be used to help the access point parse the probe request. For example, protocol types and protocol releases used by different vendors may be different. After receiving the probe request, the access point may obtain, by using vendor information, a protocol corresponding to the probe request, or obtain, with reference to vendor information and a release value of a protocol, a protocol corresponding to the probe request, to obtain a meaning of each field of the probe request, so that the probe request is correctly parsed.

Optionally, the signal strength threshold may be a signal strength threshold indicated by the probe request, or may be a signal strength threshold specified by the access point. The signal strength threshold specified by the access point may be a signal strength threshold directly saved by the access point, or may be a signal strength threshold that is obtained by the access point by means of a related setting. The signal strength threshold specified by the access point is not limited in the present disclosure.

In an optional implementation manner, the determining, by the processor 602, a first station in the at least one station according to the probe request sent by the at least one station includes: performing, by the processor 602, sorting according to a signal strength of the probe request sent by the at least one station, and determining a probe request whose signal strength is greater than the signal strength threshold; and if the identifier included in the probe request whose signal strength is greater than the signal strength threshold matches the identifier of the access point, determining that a station sending the probe request whose signal strength is greater than the signal strength threshold is used as the first station.

Optionally, the determined probe request whose signal strength is greater than the signal strength threshold may be a probe request whose signal strength is greater than the signal strength threshold and whose signal strength is the highest, or may be any one of probe requests whose signal strengths are greater than the signal strength threshold. A specific method for determining the probe request whose signal strength is greater than the signal strength threshold may be set and adjusted according to an actual situation, and is not limited in the present disclosure. Optionally, if the determined probe request whose signal strength is greater than the signal strength threshold does not meet a requirement of subsequent determining, for example, the identifier included in the probe request does not match the access point, a probe request may be determined then in other probe requests whose signal strengths are greater than the signal strength threshold, to continue performing determining.

In an optional implementation manner, the determining, by the processor 602, a first station in the at least one station according to the probe request sent by the at least one station includes: determining, by the processor 602 according to the probe request sent by the at least one station, the probe request that includes the identifier of the target access point matching the identifier of the access point; and if the signal strength of the probe request that includes the identifier of the target access point matching the identifier of the access point is greater than the signal strength threshold, determining that a station sending the probe request that includes the identifier of the target access point matching the identifier of the access point is used as the first station.

If the signal strength of the determined probe request that includes the identifier of the target access point matching the identifier of the access point is less than the signal strength threshold, the probe request is discarded. It is determined that determining of whether a signal strength is greater than the signal strength threshold is performed on a probe request that is sent by another station and that includes the identifier of the target access point matching the identifier of the access point. A first station meeting the determining that the signal strength is greater than the signal strength threshold is determined. If no probe request meets the foregoing requirement, a registrar protocol interaction between the access point and the station cannot be automatically triggered.

The processor 602 performs determining and processing on multiple received probe requests, avoiding interaction conflicts between the access point and multiple stations, and effectively ensuring a process of automatically triggering a registrar protocol.

In an optional implementation manner, after the processor 602 determines the first station in the at least one station according to the probe request sent by the at least one station, the transceiver 606 is further configured to send a probe response to the first station, where the probe response is used by the first station to automatically trigger a registrar protocol interaction between the access point and the first station.

The probe response is a response to the probe request. The probe response includes an identifier of the first station, and the identifier indicates a target station. Optionally, the probe response may further include the signal strength threshold specified by the access point. A registrar protocol interaction is automatically triggered only when the specified signal strength threshold is used to indicate a signal strength threshold needing to be achieved by the probe response received by the first station. The signal strength threshold specified by the access point that is included in the probe response may be a specific numerical value of the signal strength threshold, or may be a code indicating the signal strength threshold. A target station receiving the probe response includes a correspondence between a code of the signal strength threshold and a specific numerical value of the signal strength threshold, and the numerical value corresponding to the signal strength threshold may be obtained by using the code of the signal strength threshold. Optionally, the probe response may not include the signal strength threshold specified by the access point. After receiving the probe response, the first station determines whether a signal strength of the probe response is greater than the signal strength threshold, where the signal strength threshold is a signal strength threshold specified by the first station.

After the probe request received by the access point meets the requirement, the probe response is sent to the first station, so that the first station and the access point synchronously trigger a registrar protocol, improving security and stability, and further ensuring the process of automatically triggering the registrar protocol.

In an optional implementation manner, before the transceiver 606 receives the probe request sent by the station, the transceiver 606 further sends a broadcast message. The broadcast message may be a beacon frame. Optionally, the broadcast message includes the signal strength threshold specified by the access point, and the specified signal strength threshold indicates a lowest requirement on a signal strength that the station needs to achieve when receiving the broadcast message. Optionally, the broadcast message further includes an address of the target station, and the address indicates the station responding to the broadcast message. Optionally, the broadcast message may further include a release of a triggered registrar protocol for a WSC. Optionally, the broadcast message may further include vendor information.

The broadcast message may be used to help find, through searching, the target station that matches the access point, implementing initial matching between an access point and a station that automatically trigger the registrar protocol.

The foregoing probe request, probe response, and broadcast message may be of a frame structure of a management frame shown in FIG. 8. The identifier of the access point, the identifier of the station, the signal strength threshold, the release of the triggered registrar protocol for the WSC, the vendor information, and the like that are included in the probe request, the probe response, and the broadcast message may all be carried in an information part of an extended part 804.

It should be understood that the access point 600 provided in this embodiment of the present disclosure can implement the corresponding procedures of the methods in FIG. 1 and FIG. 2, and for brevity, details are not described herein. Related descriptions in the foregoing method embodiments are also applicable to this embodiment.

It should be noted that although the access point 600 shown in FIG. 6 shows only the processor 602, the memory 604, the transceiver 606, and the bus 608, a person skilled in the art should understand that in a specific implementation process, the access point 600 further includes another device required for implementing normal running. Moreover, a person skilled in the art should understand that according to a specific requirement, the access point 600 may further include a hardware device for implementing another additional function. In addition, a person skilled in the art should understand that the access point 600 may include only a device required for implementing this embodiment of the present disclosure, and not necessarily include all devices shown in FIG. 6.

The hardware structure shown in FIG. 6 and the foregoing descriptions are applicable to all access points provided in the embodiments of the present disclosure. It can be known by a person of ordinary skill in the art that all or some of the steps in the foregoing method may be performed by a program instructing relevant hardware. The program may be stored in a computer readable storage medium, and the computer readable storage medium is, for example, a read-only memory (ROM), a random-access memory (RAM), or an optical disc.

Figure 7:
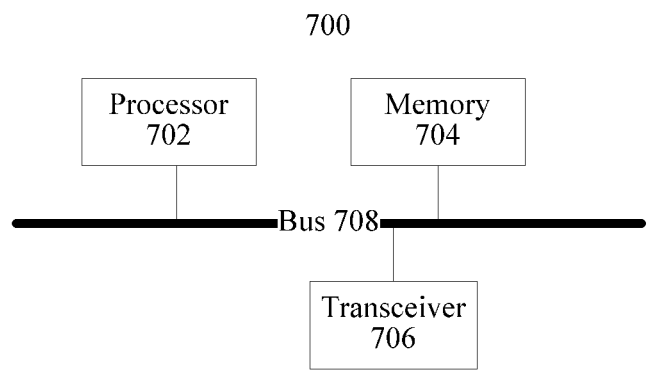
FIG. 7 is a schematic diagram of a hardware structure of a station according to Embodiment 7 of the present disclosure.

FIG. 7 is a schematic diagram of a hardware structure of a station according to Embodiment 7 of the present disclosure.

Composition components of the station are specifically described below with reference to FIG. 7.

The station 700 includes a processor 702, a memory 704, and a transceiver 706. The processor 702, the memory 704, and the transceiver 706 communicate with each other by using a bus 708.

The memory 704 is configured to store an instruction.

The transceiver 706 is configured to receive a message sent by an access point.

The processor 702 is a control center of the station, connects all parts of an entire computer by using various interfaces and lines, and performs various functions of the station and processes data by running or executing a software program and/or an application unit stored in the memory 704 and invoking data stored in the memory 704, so as to monitor the entire station.

Specifically, in an embodiment of the station, as shown in FIG. 7, the station includes: the transceiver 706 configured to send a probe request to at least one access point; the transceiver 706, further configured to receive a probe response sent by the at least one access point, where the probe response includes an identifier of a target station; the processor 702 configured to determine a first access point in the at least one access point according to the probe response sent by the at least one access point, where the identifier of the target station included in the probe response sent by the first access point matches an identifier of the station, and a signal strength of a probe request sent by the target station is greater than a first signal strength threshold; and the processor 702, further configured to automatically trigger a registrar protocol interaction between the station and the first access point.

In an optional implementation manner, that the identifier of the target station included in the probe response sent by the first access point matches the identifier of the station may be: the identifier of the target station is the same as the identifier of the station. For example, the identifier of the target station may be a physical MAC address of the target station, and the MAC address of the target station is the same as a MAC address of the station. Alternatively, the identifier of the target station may be an identifier code, and an identifier corresponding to the identifier code is the same as the identifier of the station. A specific implementation manner in which the identifier of the target station matches the identifier of the station is not limited in the present disclosure.

In an optional implementation manner, after determining the first access point in the at least one access point according to the probe response sent by the at least one access point, the processor directly and automatically triggers a registrar protocol interaction between the station and the first access point. "Directly" refers to that the processor can trigger a registrar protocol interaction between the station and the first access point after determining the first access point, without needing to perform other processing, for example, determining of another condition. The automatically triggering a registrar protocol interaction between the station and the first access point may be triggering a registrar protocol interaction mechanism, and when the transceiver receives a registrar protocol message of the first access point, the processor responds to the message; or may be that the processor controls the transceiver to initiate a related message of a registrar protocol interaction, such as a request, to the first access point. A process of the registrar protocol interaction is not limited in the present disclosure. Optionally, an access point that sends the probe request including the identifier of the target station that matches the identifier of the station and that sends the probe response whose signal strength is equal to a first signal strength threshold may also be used as the first access point.

After receiving a probe response, the station provided in this embodiment determines that an identifier of a target station included in the probe response matches an identifier of the station and that a signal strength of the probe response is greater than a signal strength threshold. In this way, matching between a station and an access point is implemented, a registrar protocol is automatically triggered, and a process of triggering the registrar protocol for a Wi-Fi configuration is optimized.

Optionally, the probe response includes the identifier of the station, and the identifier indicates a target station receiving the probe response. The probe response may further include a signal strength threshold, and the signal strength threshold indicates a signal strength needing to be achieved by the probe response received by the station.

The first signal strength threshold may be the signal strength threshold indicated by the probe response, or may be a signal strength threshold specified by the station. The signal strength threshold specified by the station may be a signal strength threshold directly saved by the station, or may be a signal strength threshold that is obtained by the station by means of a related setting. The signal strength threshold specified by the station is not limited in the present disclosure.

In an optional implementation manner, the determining, by the processor, a first access point in the at least one access point according to the probe response sent by the at least one access point includes: performing sorting according to a signal strength of the probe response sent by the at least one access point, and determining a probe response whose signal strength is greater than the first signal strength threshold; and if the identifier of the target station included in the probe response whose signal strength is greater than the first signal strength threshold matches the identifier of the station, determining that an access point sending the probe response whose signal strength is greater than the first signal strength threshold is used as the first access point.

Optionally, the determined probe response whose signal strength is greater than the first signal strength threshold may be a probe response whose signal strength is greater than the first signal strength threshold and whose signal strength is the highest, or may be any one of probe responses whose signal strengths are greater than the first signal strength threshold. A specific method for determining the probe response whose signal strength is greater than the first signal strength threshold may be set and adjusted according to an actual situation, and is not limited in the present disclosure. Optionally, if the determined probe response whose signal strength is greater than the first signal strength threshold does not meet a requirement of subsequent determining, for example, the identifier of the target station included in the probe response does not match the station, a probe response may be determined then in other probe responses whose signal strengths are greater than the signal strength threshold, to continue performing determining.

In an optional implementation manner, the determining, by the processor, a first access point in the at least one access point according to the probe response sent by the at least one access point includes: determining, according to the probe response sent by the at least one access point, a probe response that includes the identifier of the target station that matches the identifier of the station; and if the signal strength of the probe response that includes the identifier of the target station that matches the identifier of the station is greater than the first signal strength threshold, determining that an access point for the probe response that includes the identifier of the target station that matches the identifier of the station is used as the first access point.

If the signal strength of the determined probe response that includes the identifier of the target station that matches the identifier of the station is less than the first signal strength threshold, the probe response is discarded. It is determined that determining of whether a signal strength is greater than the first signal strength threshold is performed on a probe response that is sent by another access point and that includes the identifier of the target station that matches the identifier of the station. A first access point meeting the determining that the signal strength is greater than the first signal strength threshold is determined. If no probe response meets the foregoing requirement, a registrar protocol interaction between the station and the first access point cannot be automatically triggered.

In an optional implementation manner, before receiving the probe response sent by the at least one access point, the transceiver is further configured to receive a broadcast message sent by the first access point; and when determining that a signal strength of the broadcast message is greater than a second signal strength threshold, the processor controls the transceiver to send a probe request to the first access point, where the probe request includes an identifier of the first access point, and is used by the first access point to trigger a registrar protocol interaction with the station; and the probe response is a response to the probe request.

In an optional implementation manner, the second signal strength threshold is a signal strength threshold indicated by the broadcast message, or may be the signal strength threshold specified by the station.

After being powered on, if the station currently accesses no access point, the station automatically scans an ambient access point signal. The transceiver 706 receives the broadcast message sent by the access point, where the broadcast message may be a beacon frame sent by the access point. Optionally, the broadcast message includes the signal strength threshold, and the signal strength threshold indicates a lowest requirement needing to be achieved by the signal strength of the broadcast message received by the station.

In an optional implementation manner, the transceiver 706 may receive broadcast messages of multiple access points, and before the processor 702 determines that the signal strength of the broadcast message is greater than the second signal strength threshold, the processor 702 is further configured to: sort according to a signal strength of a broadcast message sent by the at least one access point, and determine the broadcast message whose signal strength is greater than the second signal strength threshold, where the identifier included in the probe request is an identifier of the access point sending the determined broadcast message whose signal strength is greater than the second signal strength threshold.

Optionally, the broadcast message whose signal strength is greater than the second signal strength threshold may be a broadcast message whose signal strength is the highest, or may be any one of broadcast messages whose signal strengths set by the station are higher than a predetermined value. The determined broadcast message whose signal strength is greater than the second signal strength threshold may be set and adjusted according to an actual situation, and is not limited in the present disclosure.

Optionally, the first signal strength threshold and the second signal strength threshold may be a same value or may be different values.

The station performs determining and processing on multiple received broadcast messages, avoiding interaction conflicts between the station and multiple access points, and effectively ensuring a process of automatically triggering a registrar protocol.

In an optional implementation manner, the foregoing solution may be a solution when the station does not clearly learn that the station is connected to which access point to trigger a registrar protocol interaction. In an optional implementation manner, when the station clearly learns a corresponding access point triggering a registrar protocol interaction, the solution of the station is specifically: the transceiver is configured to send a probe request to the access point, where the probe request includes an identifier of the access point; the transceiver is further configured to receive a probe response that is sent by the access point according to the probe request; the processor is configured to determine that a signal strength of the probe response is greater than a first signal strength threshold; and the processor is further configured to automatically trigger a registrar protocol interaction between the station and the first access point.

The first signal strength threshold may be a signal strength threshold indicated by the probe response, or may be a signal strength threshold specified by the station, and is the same as the first signal strength threshold in the foregoing solution.

In an optional implementation manner, before the station sends the probe request to the access point, the transceiver is further configured to receive a broadcast message sent by the access point; and when determining that the signal strength of the broadcast message is greater than a second signal strength threshold, the processor controls the transceiver to send the probe request to the access point.

Optionally, the first signal strength threshold and the second signal strength threshold may be a same value or may be different values.

The foregoing probe request, probe response, and broadcast message may be of a frame structure of a management frame shown in FIG. 8. The identifier of the access point, an identifier of the station, the signal strength threshold, a release of a triggered registrar protocol for a WSC, vendor information, and the like that are included in the probe request, the probe response, and the broadcast message may all be carried in an information part of an extended part 804. It should be understood that the access point 600 provided in this embodiment of the present disclosure can implement the corresponding procedures of the methods in FIGS. 1 to 3, and for brevity, details are not described herein. Related descriptions in the foregoing method embodiments are also applicable to this embodiment.

It should be understood that, in all embodiments of this specification, the station may be a computer (including a hand-held computer system, such as a smartphone or a tablet computer), or may be a server. As shown in FIG. 7, the station generally includes at least one processor (for example, central processing unit (CPU)), a receiver, and at least one bus. The processor is a control center of an electronic device, connects all parts of the entire electronic device by using various interfaces and lines, and performs various functions of the electronic device and/or processes data by running or executing software programs and/or modules stored in a storage unit, and invoking data stored in the storage unit. The processor may include an integrated circuit (IC), for example, may include a single packaged IC, or may include multiple connected ICs having a same function or different functions. For example, the processor may include only a CPU, or may be a combination of a graphics processing unit (GPU), a digital signal processor (DSP), and a control chip (for example, a baseband chip) in a communications unit. In an implementation manner of the present disclosure, the CPU may be a single operation core, or may include multiple operation cores.

It should be noted that although the station 700 shown in FIG. 7 shows only the processor 702, the memory 704, the transceiver 706, and the bus 708, a person skilled in the art should understand that in a specific implementation process, the station 700 further includes another device required for implementing normal running. Moreover, a person skilled in the art should understand that according to a specific requirement, the station 700 may further include a hardware device for implementing another additional function. In addition, a person skilled in the art should understand that the station 700 may include only a device required for implementing this embodiment of the present disclosure, and not necessarily include all devices shown in FIG. 7.

The hardware structure shown in FIG. 7 and the foregoing descriptions are applicable to all stations provided in the embodiments of the present disclosure. It can be known by a person of ordinary skill in the art that all or some of the steps in the foregoing method may be performed by a program instructing relevant hardware. The program may be stored in a computer readable storage medium, and the computer readable storage medium is, for example, a ROM, a RAM, or an optical disc.

An embodiment of the present disclosure provides a management frame 800. As shown in FIG. 8, the management frame 800 includes a conventional frame part 802 and an extended part 804.

The conventional frame part 802 includes a frame type field, used to indicate a type of the management frame.

The extended part 804 includes an extended element ID field, used to indicate a type of the extended part.

An element identifier may be a signal strength ID value. The extended part 804 of the management frame 800 instructs a target device, such as an access point or a station, receiving the management frame to determine whether a signal strength for receiving the management frame is greater than a signal strength threshold.

Optionally, the element identifier field may be represented by using one byte. The signal strength ID value is a specific defined value, and may be a field reserved in an original protocol, for example, a reserved field value, for example, 120, of an Element ID of the 802.11 protocol, or may be another specified value, which is not limited in the present disclosure.

The extended part 804 may further include a length field and an information part, and the length field indicates a length of an information field. Optionally, the length field may be represented by using one byte. The information part may include a physical address, indicating a target device, such as an access point or a station, receiving the management frame 800.

The information part of the extended part 804 may further include a signal strength threshold field. The field instructs a target device, such as an access point or a station, receiving the management frame to determine whether a signal strength for receiving the management frame is greater than a signal strength threshold indicated by the signal strength threshold field. Optionally, the signal strength threshold field may be represented by using two bytes.

The information part of the extended part 804 may further include a protocol release field. The field notifies, to the target device, such as an access point or a station, receiving the management frame, a release of a protocol used by the management frame, so as to instruct the target device to parse the management frame according to a meaning of a field defined in the protocol of this release. Optionally, the protocol release field may be represented by using two bytes.

The information part of the extended part 804 may further include a vendor information field, the field notifies, to the target device, such as an access point or a station, receiving the management frame, vendor information included in the management frame, so as to instruct the target device to parse the management frame according to a meaning of a field defined in a protocol used by the vendor. Optionally, the vendor information field may be represented by using two bytes.

The management frame may include a probe request frame and a probe response frame, and may further include a beacon frame. The access point and the station in Embodiment 1 to Embodiment 7 may implement automatic triggering of a registrar protocol interaction by sending a management frame whose element identifier is the signal strength ID value.

The probe request frame includes a conventional frame part and an extended part. The extended part includes an Element ID, a Length, and an Information part. The Information part includes a field of an identifier of the access point, and the field of the identifier indicates a target access point receiving the probe request frame. The identifier may be a physical address of the access point. Optionally, the Element ID is represented by using one byte, and the Length is represented by using one byte. Optionally, the identifier of the access point included in the Information part is represented by using six bytes. For example, the physical address of the access point is identified by using sixth bytes. The Information part may further include a signal strength threshold field, and the signal strength threshold field indicates a lowest requirement needing to be achieved by a signal strength of the probe request frame received by the access point. Optionally, the signal strength threshold field is represented by using two bytes. After receiving the probe request frame, the access point parses the probe request frame, and determines that the identifier included in the probe request frame matches the identifier of the access point. When the signal strength of the probe request frame is greater than a signal strength threshold, a registrar protocol interaction is automatically triggered. A process of the registrar protocol interaction for a WSC is not limited in the present disclosure. If the access point determines that the identifier included in the Information part of the probe request frame does not match the identifier of the access point, or the signal strength of the probe request frame is less than the signal strength threshold, the probe request frame is discarded. The Information part may further include a protocol release field, and a release of a protocol used by the probe request frame is notified to the access point receiving the probe request frame, to instruct the access point to parse the probe request frame according to a meaning of a field defined in the protocol of this release. Optionally, the protocol release field is represented by using two bytes. The probe request frame may further include a vendor information field, and the field notifies, to the access point receiving the probe request frame, vendor information of a station sending the probe request frame, to instruct the access point to parse the probe request frame according to a meaning of the field defined in a protocol used by the vendor. Optionally, the vendor information field may be represented by using two bytes.

The probe response frame includes a conventional frame part and an extended part. The extended part includes an Element ID, a Length, and an Information part. The Information part includes a field of an identifier of the station, and the field of the identifier indicates a target station receiving the probe response frame. The identifier may be a physical address of the station. Optionally, the Element ID is represented by using one byte, and the Length is represented by using one byte. Optionally, the identifier of the station included in the Information part is represented by using six bytes. For example, the physical address of the station is identified by using sixth bytes. The Information part may further include a signal strength threshold field, and the signal strength threshold field indicates a lowest requirement needing to be achieved by a signal strength of the probe response frame received by the station. Optionally, the signal strength threshold field is represented by using two bytes. After receiving the probe response frame, the station parses the probe response frame, and determines that the identifier included in the probe response frame matches the identifier of the station. When the signal strength of the probe response frame is greater than a signal strength threshold, a registrar protocol interaction is automatically triggered. A process of the registrar protocol interaction for a WSC is not limited in the present disclosure. If the station determines that the identifier included in the Information part of the probe response frame does not match the identifier of the station, or the signal strength of the probe response frame is less than the signal strength threshold, the station discards the probe response frame. The Information part may further include a protocol release field, and a release of a protocol used by the probe response frame is notified to the station receiving the probe response frame, to instruct the station to parse the probe response frame according to a meaning of a field defined in the protocol of this release. Optionally, the protocol release field is represented by using two bytes. The probe response frame may further include a vendor information field, and the field notifies, to the station receiving the probe response frame, vendor information of an access point sending the probe response frame, to instruct the station to parse the probe response frame according to a meaning of a field defined in a protocol used by the vendor. Optionally, the vendor information field may be represented by using two bytes.

The beacon frame includes a conventional frame part and an extended part. The extended part includes an Element ID, a Length, and an Information part. Optionally, the Element ID is represented by using one byte, and the Length is represented by using one byte. Optionally, the Information part may be empty. Optionally, the Information part may include a signal strength threshold field, and the signal strength threshold field indicates a lowest requirement needing to be achieved by a signal strength of the beacon frame received by the station. Optionally, the signal strength threshold field is represented by using two bytes. After receiving the beacon frame, the station parses the beacon frame. When the station determines that the signal strength of the beacon frame is greater than a signal strength threshold, the station sends a probe request to an access point sending the beacon frame. If the station determines that the signal strength of the beacon frame is less than the signal strength threshold, the station discards the beacon frame. Optionally, the Information part includes a field of an identifier of the station, and the field of the identifier indicates a target station receiving the beacon frame. The identifier may be a physical address of the station. Optionally, the identifier of the station included in the Information part is represented by using six bytes. For example, the physical address of the station is identified by using sixth bytes. The Information part may further include a protocol release field, and a release of a protocol used by the beacon frame is notified to the station receiving the beacon frame, to instruct the station to parse the beacon frame according to a meaning of a field defined in the protocol of this release. Optionally, the protocol release field is represented by using two bytes. The beacon frame may further include a vendor information field, and the field notifies, to the station receiving the beacon frame, vendor information of the access point sending the beacon frame, to instruct the station to parse the beacon frame according to a meaning of a field defined in a protocol used by a vendor. Optionally, the vendor information field may be represented by using two bytes.

FIG. 8 shows an example of a management frame provided in an embodiment of the present disclosure. The management frame 800 may include a conventional frame part 802 compatible with a format and/or information such as the IEEE802.16e or the IEEE802.11a, b, g, and n, and may further include an extended part 804. The conventional frame part 802 may include a frame control domain, duration, an address domain, a sequence control domain, service quality control, and the like. Refer to descriptions of a frame header of the management frame of the IEEE802.16e or the IEEE802.11a, b, g, and n. Specific details are not described in the present disclosure. The extended part 804 is an extended information element IE, and as shown in the figure, includes an element ID, a length, and information. Optionally, the element ID may be represented by using one byte, indicating a type/an attribute of the extended IE. The length may be represented by using one byte, indicating a byte length of the information. The information may include different fields as required.

The probe request frame may be of a structure of the management frame 800 in FIG. 8, and includes a conventional frame part 802 and an extended part 804. The extended frame part 804 includes an Element ID, a Length, and Information. Optionally, the Element ID is one byte, the Length is one byte, and the Information part includes an identifier, such as a physical MAC address, of an access point, and is represented by using six bytes. The Information part may further include a received signal strength indicator (RSSI), and is represented by using two bytes. The Information part may further include a version of an IE related to a signal strength, and is represented by using two bytes. The Information part may further include vendor information, and is represented by using two bytes.

The probe response frame may be of the structure of the management frame 800 in FIG. 8, and includes a conventional frame part 802 and an extended part 804. The extended frame part 804 includes an Element ID, a Length, and Information. Optionally, the Element ID is one byte, the Length is one byte, and the Information part includes an identifier, such as a physical MAC address, of a station, and is represented by using six bytes. The Information part may further include an RSSI, and is represented by using two bytes. The Information part may further include a version of an IE related to a signal strength, and is represented by using two bytes. The Information part may further include vendor information, and is represented by using two bytes.

The probe response frame may be of the structure of the management frame 800 in FIG. 8, and includes a conventional frame part 802 and an extended part 804. The extended frame part 804 includes an Element ID, a Length, and Information. The Information part may be empty. Optionally, the Element ID is one byte, and the Length is one byte. Optionally, the Information part includes an identifier, such as a physical MAC address, of an access point, and is represented by using six bytes. The Information part may further include an RSSI, and is represented by using two bytes. The Information part may further include a version of an IE related to a signal strength, and is represented by using two bytes. The Information part may further include vendor information, and is represented by using two bytes.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A method for triggering a registrar protocol interaction, used for performing a wireless simple configuration between an access point and at least one station, wherein the method comprises:
receiving, by the access point, first probe request from the at least one station, wherein the first probe request comprises a target access point identifier and a signal strength threshold;
determining, by the access point, a first station in the at least one station according to the first probe request, wherein the target access point identifier matches an access point identifier, wherein signal strength of the first probe request is greater than strength threshold; and
automatically triggering, by the access point, the register protocol interaction between the access point and the first station.

2. The method according to claim 1, wherein receiving the first probe request further comprises receiving a plurality of probe requests, and wherein determining, by the access point, the first station in the at least one station according to the first probe request comprises:
sorting, by the access point, the plurality of probe requests according to signal strengths of the probe requests;
determining the signal strength of the first probe request is greater than the signal strength threshold; and
determining the first station in the at least one station when a first access point identifier in the first probe request matches the access point identifier.

3. The method according to claim 1, wherein the method further comprises , sending a probe response to the first station, and wherein the probe response is used by the first station to trigger the registrar protocol interaction with the access point.

4. The method according to claim 3, wherein the probe response carries the signal strength threshold specified by the access point.

5. The method according to claim 3, wherein the probe response includes vendor information of the access point.

6. The method according to claim 1, further comprising sending a broadcast message to the at least one station, wherein the broadcast message comprises vendor information of the access point.

7. The method according to claim 1, wherein the first probe request comprises vendor information of the at least one station, and wherein the method further comprises using the vendor information of the at least one station to parse the first probe request.

8. A method for triggering a registrar protocol interaction, used for performing a wireless simple configuration between a station and at least one access point, wherein the method comprises:
sending, by the station, a probe request to the at least one access point;
receiving, by the station, a first probe response from the at least one access point according to the probe request, wherein the first probe response comprises a target station identifier and a first signal strength threshold;
determining, by the station, a first access point in the at least one access point according to the first probe response, wherein the target station identifier in the first probe response matches an identifier of the station, wherein a signal strength of the first probe response is greater than the first signal strength threshold; and
automatically triggering, by the station, the registrar protocol interaction between the station and the first access point.

9. The method according to claim 8, wherein receiving the first probe response further comprises receiving a plurality of probe responses, and wherein determining the first access point according to the first probe response comprises:
performing, by the station, sorting of the plurality of probe responses according to a signal strength of the probe responses;
determining the signal strength of the first probe response is greater than the first signal strength threshold; and
determining the first access point in the at least one access point when the target station identifier in the probe response matches the identifier of the station.

10. The method according to claim 8, wherein before receiving the first probe response, the method further comprises:
receiving, by the station, a broadcast message from the first access point; and
sending, by the station, a probe request to the first access point when determining that a signal strength of the broadcast message is greater than a second signal strength threshold, wherein the probe request comprises an identifier of the first access point, and wherein the identifier is used by the first access point to trigger the registrar protocol interaction with the station.

11. The method according to claim 10, wherein the probe request further comprises the first signal strength threshold specified by the station.

12. The method according to claim 8, further comprising:
receiving, by the station, a broadcast message from the at least one access point, wherein the broadcast message includes vendor information of the at least one access point; and
using, by the station, the vendor information of the at least one access point to parse the broadcast message.

13. The method according to claim 8, wherein the probe request includes vendor information of the station.

14. An access point comprising:
a transceiver configured to receive a first probe request from at least one station, wherein the first probe request comprises a target access point identifier and a signal strength threshold; and
a processor coupled to the transceiver by a bus and configured to:
determine a first station in the at least one station according to the first probe request, wherein the target access point identifier matches an access point identifier, wherein a signal strength of the first probe request is greater than the signal threshold; and
automatically trigger a registrar protocol interaction between the access point and the first station.

15. The access point according to claim 14, wherein the first probe request is received in a plurality of probe requests, and wherein the processor is further configured to:

sort the plurality of probe requests according to a signal strength of the probe requests from the at least one station;

determine the signal strength of the first probe request is greater than the signal strength threshold; and determine the first station in the at least one station when an identifier of a first access point in the probe request matches the identifier of the access point.

16. The access point according to claim 14, wherein the processor is further configured to control the transceiver to send a probe response to the first station, wherein the probe response is used by the first station to trigger the registrar protocol interaction with the access point.

17. The access point according to claim 16, wherein the probe response comprises the signal strength threshold specified by the access point.

18. The access point according to claim 16, wherein the probe response comprises vendor information of the access point.

19. The access point according to claim 14, wherein the transceiver is further configured to send a broadcast message to the at least one station, and wherein the broadcast message comprises vendor information of the access point.

20. The access point according to claim 14, wherein the first probe request comprises vendor information of the at least one station, and wherein the processor is further configured to use the vendor information of the at least one station to parse the first probe request.

* * * * *